(12) United States Patent
Childers et al.

(10) Patent No.: US 8,271,626 B2
(45) Date of Patent: Sep. 18, 2012

(54) METHODS FOR DISPLAYING PHYSICAL NETWORK TOPOLOGY AND ENVIRONMENTAL STATUS BY LOCATION, ORGANIZATION, OR RESPONSIBLE PARTY

(75) Inventors: Sloan K. Childers, Round Rock, TX (US); John Elderton, Austin, TX (US); Michael Primm, Austin, TX (US)

(73) Assignee: American Power Conversion Corporation, West Kingston, RI (US)

( * ) Notice: Subject to any disclaimer, the term of this patent is extended or adjusted under 35 U.S.C. 154(b) by 732 days.

(21) Appl. No.: 12/144,814

(22) Filed: Jun. 24, 2008

(65) Prior Publication Data

US 2008/0263150 A1    Oct. 23, 2008

Related U.S. Application Data

(63) Continuation of application No. 10/107,962, filed on Mar. 27, 2002, now Pat. No. 7,392,309, which is a continuation-in-part of application No. 10/057,563, filed on Jan. 25, 2002, now Pat. No. 7,159,022.

(60) Provisional application No. 60/311,268, filed on Aug. 9, 2001, provisional application No. 60/279,059, filed on Mar. 27, 2001, provisional application No. 60/264,445, filed on Jan. 26, 2001.

(51) Int. Cl.
*G06F 15/16* (2006.01)
(52) U.S. Cl. .......................... 709/221; 709/223
(58) Field of Classification Search ........... 709/220–224
See application file for complete search history.

(56) References Cited

U.S. PATENT DOCUMENTS

| | | | |
|---|---|---|---|
| 3,810,138 | A | 5/1974 | Thompson et al. |
| 4,349,879 | A | 9/1982 | Peddie et al. |
| 4,521,645 | A | 6/1985 | Carroll |
| 4,535,598 | A | 8/1985 | Mount |
| 4,568,934 | A | 2/1986 | Allgood |
| 4,636,652 | A | 1/1987 | Raes |

(Continued)

FOREIGN PATENT DOCUMENTS

AU    3855395 A1    6/1996

(Continued)

OTHER PUBLICATIONS

Axis Communications, "Axis 2400/2401 Administration Manual Version 1.1", www.axis.com/techsup/cam_2400/index.htm, version 1.1xx, part No. 16741, pp. 1-78, Jul. 1999.

(Continued)

*Primary Examiner* — Patrice Winder
(74) *Attorney, Agent, or Firm* — Lando & Anastasi, LLP

(57) ABSTRACT

The invention is directed to a system for remote monitoring of a space and equipment. The space and equipment may, for example, be a sever room and associated network equipment. The system has network appliances, a server, and a client machine. The server receives data from a network appliance. The server may then deliver an application and data to the client machine for viewing and manipulating the data. The client machine may display the data as a mapping, displaying icons associated with the network appliances. The client machine may also graph the data. Further, the client machine may manipulate the organization of the data, the configuration settings of the network appliances, and store map and graph configurations.

20 Claims, 13 Drawing Sheets

| | DATA | PARAMETER #1 | PARAMETER #2 | PARAMETER #3 | PARAMETER #4 |
|---|---|---|---|---|---|
| NETWORK APPLIANCE #1 | A | AA | BA | CA | DA |
| NETWORK APPLIANCE #1 | A | AB | BB | CB | DB |
| NETWORK APPLIANCE #1 | B | AC | BC | CC | DC |
| NETWORK APPLIANCE #1 | B | AD | BD | CD | DD |
| NETWORK APPLIANCE #1 | C | AE | BE | CE | DE |

| | DATA | PARAMETER #1 | PARAMETER #2 | PARAMETER #3 | PARAMETER #4 |
|---|---|---|---|---|---|
| NETWORK APPLIANCE #1 | A | AA | BA | EA | DA |
| NETWORK APPLIANCE #1 | A | AA | BB | EA | DB |
| NETWORK APPLIANCE #1 | B | AA | BB | EA | DC |
| NETWORK APPLIANCE #1 | B | AA | BD | CD | DD |
| NETWORK APPLIANCE #1 | D | AA | BE | CE | DE |

U.S. PATENT DOCUMENTS

| | | | |
|---|---|---|---|
| 4,637,020 A | 1/1987 | Schinabeck | |
| 4,650,347 A | 3/1987 | Shigemura et al. | |
| 4,668,939 A | 5/1987 | Kimura et al. | |
| 4,686,450 A | 8/1987 | Pichat | |
| 4,718,025 A | 1/1988 | Minor et al. | |
| 4,747,041 A | 5/1988 | Engel et al. | |
| 4,751,648 A | 6/1988 | Sears, III et al. | |
| 4,816,208 A | 3/1989 | Woods et al. | |
| 4,823,290 A | 4/1989 | Fasack et al. | |
| 4,964,065 A | 10/1990 | Hicks et al. | |
| 5,043,807 A | 8/1991 | Rabii | |
| 5,061,916 A | 10/1991 | French et al. | |
| 5,086,385 A | 2/1992 | Launey et al. | |
| 5,097,328 A | 3/1992 | Boyette | |
| 5,109,278 A | 4/1992 | Erickson et al. | |
| 5,153,837 A | 10/1992 | Shaffer et al. | |
| 5,157,732 A | 10/1992 | Ishii et al. | |
| 5,168,171 A | 12/1992 | Tracewell | |
| 5,189,394 A | 2/1993 | Walter et al. | |
| 5,216,623 A | 6/1993 | Barrett et al. | |
| 5,220,522 A | 6/1993 | Wilson et al. | |
| 5,225,997 A | 7/1993 | Lederer et al. | |
| 5,229,850 A | 7/1993 | Toyoshima | |
| 5,262,758 A | 11/1993 | Nam et al. | |
| 5,289,275 A | 2/1994 | Ishii et al. | |
| 5,367,670 A | 11/1994 | Ward et al. | |
| 5,382,943 A | 1/1995 | Tanaka | |
| 5,395,042 A | 3/1995 | Riley et al. | |
| 5,400,246 A | 3/1995 | Wilson et al. | |
| 5,404,136 A | 4/1995 | Marsden | |
| 5,475,364 A | 12/1995 | Kenet | |
| 5,488,430 A | 1/1996 | Hong | |
| 5,491,511 A | 2/1996 | Odle | |
| 5,508,941 A | 4/1996 | Leplingard et al. | |
| 5,528,507 A | 6/1996 | McNamara et al. | |
| 5,548,659 A | 8/1996 | Okamoto | |
| 5,553,609 A | 9/1996 | Chen et al. | |
| 5,561,476 A | 10/1996 | Kershaw et al. | |
| 5,566,339 A | 10/1996 | Perholtz et al. | |
| 5,572,195 A | 11/1996 | Heller et al. | |
| 5,581,478 A | 12/1996 | Cruse et al. | |
| 5,586,202 A | 12/1996 | Ohki et al. | |
| 5,588,067 A | 12/1996 | Peterson et al. | |
| 5,589,764 A | 12/1996 | Lee | |
| 5,602,585 A | 2/1997 | Dickinson et al. | |
| 5,621,662 A | 4/1997 | Humphries et al. | |
| 5,634,002 A | 5/1997 | Polk et al. | |
| 5,659,470 A | 8/1997 | Goska et al. | |
| 5,664,202 A | 9/1997 | Chen et al. | |
| 5,715,160 A | 2/1998 | Plotke | |
| 5,731,832 A | 3/1998 | Ng | |
| 5,732,074 A | 3/1998 | Spaur et al. | |
| 5,732,219 A * | 3/1998 | Blumer et al. | 709/227 |
| 5,742,762 A | 4/1998 | Scholl et al. | |
| RE35,793 E | 5/1998 | Halpern | |
| 5,768,430 A | 6/1998 | Takashima et al. | |
| 5,798,798 A | 8/1998 | Rector et al. | |
| 5,805,458 A | 9/1998 | McNamara et al. | |
| 5,812,055 A | 9/1998 | Candy et al. | |
| 5,818,725 A | 10/1998 | McNamara et al. | |
| 5,822,302 A | 10/1998 | Landry, Jr. et al. | |
| 5,829,130 A | 11/1998 | Miller | |
| 5,860,857 A | 1/1999 | Wasastjerna et al. | |
| 5,870,698 A | 2/1999 | Riedel et al. | |
| 5,872,931 A | 2/1999 | Chivaluri | |
| 5,892,440 A | 4/1999 | Bryan | |
| 5,905,867 A | 5/1999 | Giorgio | |
| 5,926,210 A | 7/1999 | Hackett et al. | |
| 5,937,092 A | 8/1999 | Wootton et al. | |
| 5,937,097 A | 8/1999 | Lennon | |
| 5,949,974 A | 9/1999 | Ewing et al. | |
| 5,955,946 A | 9/1999 | Beheshti et al. | |
| 5,963,457 A | 10/1999 | Kanoi et al. | |
| 5,968,116 A | 10/1999 | Day, II et al. | |
| 5,974,237 A | 10/1999 | Shurmer et al. | |
| 5,978,594 A | 11/1999 | Bonnell et al. | |
| 5,978,912 A | 11/1999 | Rakavy et al. | |
| 5,987,614 A | 11/1999 | Mitchell et al. | |
| 5,991,885 A | 11/1999 | Chang et al. | |
| 6,001,065 A | 12/1999 | DeVito | |
| 6,006,171 A | 12/1999 | Vines et al. | |
| 6,052,750 A | 4/2000 | Lea | |
| 6,055,480 A | 4/2000 | Nevo et al. | |
| 6,057,834 A | 5/2000 | Pickover | |
| 6,058,434 A | 5/2000 | Wilt et al. | |
| 6,078,253 A | 6/2000 | Fowler | |
| 6,078,957 A | 6/2000 | Adelman et al. | |
| 6,081,606 A | 6/2000 | Hansen et al. | |
| 6,085,243 A | 7/2000 | Fletcher et al. | |
| 6,088,816 A | 7/2000 | Nouri et al. | |
| 6,094,676 A | 7/2000 | Everett et al. | |
| 6,100,806 A | 8/2000 | Gaukel | |
| 6,104,755 A | 8/2000 | Ohara | |
| 6,105,061 A | 8/2000 | Nakai | |
| 6,108,782 A | 8/2000 | Fletcher et al. | |
| 6,112,235 A | 8/2000 | Spofford | |
| 6,115,468 A | 9/2000 | De Nicolo | |
| 6,122,603 A | 9/2000 | Budike, Jr. | |
| 6,122,639 A | 9/2000 | Babu et al. | |
| 6,125,145 A | 9/2000 | Koyanagi et al. | |
| 6,128,016 A * | 10/2000 | Coelho et al. | 715/808 |
| 6,138,078 A | 10/2000 | Canada et al. | |
| 6,138,249 A | 10/2000 | Nolet | |
| 6,139,177 A | 10/2000 | Venkatraman et al. | |
| 6,144,770 A | 11/2000 | Lennon | |
| 6,148,262 A | 11/2000 | Fry | |
| 6,157,943 A | 12/2000 | Meyer | |
| 6,160,584 A | 12/2000 | Yanagita | |
| 6,160,926 A | 12/2000 | Dow et al. | |
| 6,167,406 A | 12/2000 | Hoskins et al. | |
| 6,170,007 B1 | 1/2001 | Venkatraman et al. | |
| 6,173,323 B1 | 1/2001 | Moghe | |
| 6,175,866 B1 | 1/2001 | Holloway et al. | |
| 6,175,886 B1 | 1/2001 | Usami | |
| 6,175,927 B1 | 1/2001 | Cromer et al. | |
| 6,177,884 B1 | 1/2001 | Hunt et al. | |
| 6,182,094 B1 | 1/2001 | Humpleman et al. | |
| 6,182,157 B1 | 1/2001 | Schlener et al. | |
| 6,189,109 B1 | 2/2001 | Sheikh et al. | |
| 6,195,018 B1 | 2/2001 | Ragle et al. | |
| 6,208,261 B1 | 3/2001 | Olstead | |
| 6,208,345 B1 | 3/2001 | Sheard et al. | |
| 6,215,404 B1 | 4/2001 | Morales | |
| 6,216,956 B1 | 4/2001 | Ehlers et al. | |
| 6,219,628 B1 | 4/2001 | Kodosky et al. | |
| 6,229,429 B1 | 5/2001 | Horon | |
| 6,236,332 B1 | 5/2001 | Conkright et al. | |
| 6,246,780 B1 | 6/2001 | Sato | |
| 6,259,956 B1 | 7/2001 | Myers et al. | |
| 6,266,721 B1 | 7/2001 | Sheikh et al. | |
| 6,271,845 B1 | 8/2001 | Richardson | |
| 6,281,790 B1 | 8/2001 | Kimmel et al. | |
| 6,282,546 B1 | 8/2001 | Gleichauf et al. | |
| 6,298,144 B1 | 10/2001 | Pucker, II et al. | |
| 6,304,900 B1 | 10/2001 | Cromer | |
| 6,311,105 B1 | 10/2001 | Budike, Jr. | |
| 6,311,214 B1 | 10/2001 | Rhoads | |
| 6,324,644 B1 | 11/2001 | Rakavy et al. | |
| 6,329,792 B1 | 12/2001 | Dunn et al. | |
| 6,332,202 B1 | 12/2001 | Sheikh et al. | |
| 6,338,094 B1 | 1/2002 | Scott et al. | |
| 6,338,437 B1 | 1/2002 | Kline et al. | |
| 6,343,320 B1 | 1/2002 | Fairchild et al. | |
| 6,360,255 B1 | 3/2002 | McCormack et al. | |
| 6,363,421 B2 | 3/2002 | Barker et al. | |
| 6,363,422 B1 | 3/2002 | Hunter et al. | |
| 6,373,840 B1 | 4/2002 | Chen | |
| 6,374,296 B1 | 4/2002 | Lim et al. | |
| 6,375,614 B1 | 4/2002 | Braun et al. | |
| 6,381,700 B1 | 4/2002 | Yoshida | |
| 6,389,464 B1 | 5/2002 | Krishnamurthy et al. | |
| 6,396,534 B1 | 5/2002 | Mahler et al. | |
| 6,400,103 B1 | 6/2002 | Adamson | |
| 6,400,996 B1 | 6/2002 | Hoffberg et al. | |
| 6,402,691 B1 | 6/2002 | Peddicord et al. | |
| 6,404,348 B1 | 6/2002 | Wilfong | |
| 6,405,216 B1 | 6/2002 | Minnaert et al. | |

| | | | | | | |
|---|---|---|---|---|---|---|
| 6,437,691 B1 | 8/2002 | Sandelman et al. | EP | 0977112 | A2 | 7/1999 |
| 6,449,745 B1 | 9/2002 | Kim et al. | EP | 0956680 | A1 | 11/1999 |
| 6,477,667 B1 | 11/2002 | Levi et al. | EP | 1014622 | A2 | 12/1999 |
| 6,496,105 B2 | 12/2002 | Fisher et al. | EP | 0990986 | A | 4/2000 |
| 6,505,086 B1 | 1/2003 | Dodd, Jr. et al. | EP | 0992100 | A2 | 4/2000 |
| 6,505,256 B1 | 1/2003 | York | EP | 1002268 | A1 | 5/2000 |
| 6,510,350 B1 | 1/2003 | Steen, III et al. | EP | 1009130 | A | 6/2000 |
| 6,529,230 B1 | 3/2003 | Chong | EP | 1014622 | A2 * | 6/2000 |
| 6,529,936 B1 | 3/2003 | Mayo et al. | EP | 1032884 | A1 | 9/2000 |
| 6,553,336 B1 | 4/2003 | Johnson et al. | EP | 1049291 | A2 | 11/2000 |
| 6,553,418 B1 | 4/2003 | Collins et al. | EP | 1115264 | A2 | 12/2000 |
| 6,591,279 B1 | 7/2003 | Emens et al. | EP | 1124301 | A2 | 12/2000 |
| 6,611,866 B1 | 8/2003 | Goldman | EP | 1096724 | | 5/2001 |
| 6,640,145 B2 | 10/2003 | Hoffberg et al. | EP | 1107519 | | 6/2001 |
| 6,658,595 B1 | 12/2003 | Thamattoor | EP | 1142289 | A1 | 10/2001 |
| 6,681,787 B2 | 1/2004 | Tinsley et al. | EP | 1150188 | A2 | 10/2001 |
| 6,686,838 B1 * | 2/2004 | Rezvani et al. ............... 709/224 | EP | 1178628 | A2 | 2/2002 |
| 6,714,977 B1 | 3/2004 | Fowler et al. | GB | 9826895 | A | 1/1999 |
| 6,718,364 B2 | 4/2004 | Connelly et al. | GB | 9913682 | A | 8/1999 |
| 6,756,998 B1 | 6/2004 | Bilger | GB | 2335124 | A | 9/1999 |
| 6,801,940 B1 | 10/2004 | Moran et al. | GB | 2343036 | A | 4/2000 |
| 6,829,630 B1 | 12/2004 | Pajak et al. | GB | 2344718 | A | 6/2000 |
| 6,990,513 B2 | 1/2006 | Belfiore et al. | GB | 2351205 | A | 12/2000 |
| 7,051,096 B1 | 5/2006 | Krawiec et al. | GB | 2344718 | B | 1/2001 |
| 7,159,022 B2 | 1/2007 | Primm et al. | GB | 2355163 | A | 4/2001 |
| 7,206,824 B2 * | 4/2007 | Somashekar et al. ......... 709/220 | GB | 2359369 | A | 8/2001 |
| 7,207,041 B2 | 4/2007 | Elson et al. | GB | 2361156 | A * | 10/2001 |
| 7,330,886 B2 | 2/2008 | Childers et al. | HU | 9300145 | U0 | 8/1993 |
| 7,392,309 B2 | 6/2008 | Childers et al. | JP | 3099398 | A2 | 4/1991 |
| 7,529,838 B2 | 5/2009 | Primm et al. | JP | 6105376 | A2 | 4/1994 |
| 7,698,389 B2 * | 4/2010 | Sesek et al. .................... 709/220 | JP | 6119581 | A2 | 4/1994 |
| 2001/0005894 A1 | 6/2001 | Fukui | JP | 07270459 | | 10/1995 |
| 2001/0047213 A1 | 11/2001 | Sepe, Jr. | JP | 8307541 | A2 | 11/1996 |
| 2001/0047410 A1 | 11/2001 | Defosse | JP | 11164035 | A2 | 6/1999 |
| 2001/0052006 A1 | 12/2001 | Barker et al. | JP | 11219388 | A2 | 8/1999 |
| 2001/0055965 A1 | 12/2001 | Delp et al. | JP | 11338666 | | 12/1999 |
| 2002/0003575 A1 | 1/2002 | Marchese | JP | 2000092092 | A2 | 3/2000 |
| 2002/0023258 A1 | 2/2002 | Elwahab et al. | JP | 2000134606 | A2 | 5/2000 |
| 2002/0041603 A1 | 4/2002 | Kato | JP | 2000151606 | A2 | 5/2000 |
| 2002/0043969 A1 | 4/2002 | Duncan et al. | JP | 2000209204 | A2 | 7/2000 |
| 2002/0071031 A1 | 6/2002 | Lord et al. | JP | 2000278773 | A2 | 10/2000 |
| 2002/0072868 A1 | 6/2002 | Bartone et al. | JP | 2001024638 | | 1/2001 |
| 2002/0083378 A1 | 6/2002 | Nickels | JP | 5040889 | A2 | 4/2002 |
| 2002/0112054 A1 | 8/2002 | Hatanaka | TW | 0443058 | B | 6/2001 |
| 2002/0124081 A1 | 9/2002 | Primm et al. | TW | 0448349 | B | 8/2001 |
| 2002/0152298 A1 | 10/2002 | Kikta et al. | WO | 9521506 | | 8/1995 |
| 2002/0161885 A1 | 10/2002 | Childers et al. | WO | 9615615 | | 5/1996 |
| 2002/0174223 A1 | 11/2002 | Childers et al. | WO | 9730879 | | 8/1997 |
| 2003/0098789 A1 | 5/2003 | Murakami et al. | WO | 9801838 | | 1/1998 |
| 2003/0204756 A1 | 10/2003 | Ransom et al. | WO | WO 9804067 | A1 * | 1/1998 |
| 2004/0160897 A1 | 8/2004 | Fowler | WO | 9826541 | | 6/1998 |
| 2004/0163102 A1 | 8/2004 | Fowler et al. | WO | 9908183 | | 2/1999 |
| 2007/0088823 A1 | 4/2007 | Fowler et al. | WO | 9915950 | | 4/1999 |
| 2008/0263150 A1 | 10/2008 | Childers et al. | WO | 9927456 | | 6/1999 |
| 2009/0064046 A1 | 3/2009 | Childers et al. | WO | 9945445 | | 9/1999 |
| 2009/0121860 A1 | 5/2009 | Kimmel et al. | WO | 0035177 | | 6/2000 |
| 2009/0164031 A1 | 6/2009 | Johnson et al. | WO | 0039724 | | 7/2000 |
| | | | WO | 0054557 | | 9/2000 |
| | FOREIGN PATENT DOCUMENTS | | WO | 0073866 | A1 | 12/2000 |
| AU | 5601198 A1 | 7/1998 | WO | 0079500 | A1 | 12/2000 |
| AU | 0016673 A5 | 6/2000 | WO | 0101366 | A2 | 1/2001 |
| AU | 777375 | 10/2004 | WO | 0108396 | | 2/2001 |
| CA | 2300053 AA | 2/1999 | WO | 0127763 | A1 | 4/2001 |
| CA | 2312075 AA | 6/1999 | WO | 0131849 | | 5/2001 |
| CA | 2328939 AA | 9/1999 | WO | 0157631 | A1 | 8/2001 |
| CA | 2395450 | 5/2001 | WO | 0161665 | A2 | 8/2001 |
| CN | 87100353 A | 9/1988 | WO | 0169405 | A1 | 9/2001 |
| CN | 1294350 A | 5/2001 | WO | 0169504 | | 9/2001 |
| EP | 0444997 B1 | 2/1991 | WO | 0179935 | A1 | 10/2001 |
| EP | 0591585 B1 | 4/1994 | WO | 0157477 | C1 | 11/2001 |
| EP | 0738065 A1 | 3/1996 | WO | 0182028 | A2 | 11/2001 |
| EP | 0744112 B1 | 11/1996 | WO | 0193042 | A2 | 12/2001 |
| EP | 0859489 A2 | 1/1998 | WO | 0193508 | A1 | 12/2001 |
| EP | 0978780 A1 | 8/1998 | WO | 0197907 | A2 | 12/2001 |
| EP | 0917034 A1 | 10/1998 | WO | 0199402 | A2 | 12/2001 |
| EP | 0917034 B1 | 10/1998 | WO | 0201877 | A1 | 1/2002 |
| EP | 0963076 A3 | 5/1999 | WO | 0211391 | A2 | 2/2002 |
| EP | 0964551 A1 | 6/1999 | WO | 0169405 | C1 | 3/2002 |
| EP | 0927933 A2 | 7/1999 | WO | 0233980 | A2 | 4/2002 |

| | | |
|---|---|---|
| WO | 0237280 A2 | 5/2002 |
| WO | 0079500 C2 | 6/2002 |
| WO | 0247044 | 6/2002 |
| WO | 0247369 A1 | 6/2002 |
| WO | 0248830 A2 | 6/2002 |
| WO | 0249285 | 6/2002 |
| WO | 02060124 A2 | 8/2002 |
| WO | 02060124 A3 | 8/2002 |
| WO | 02093403 A1 | 11/2002 |
| WO | 02099683 A1 | 12/2002 |

OTHER PUBLICATIONS

Fossum, E.R., "CMOS Image Sensors: Electronic Camera-On-Chip", IEEE Transactions on Electron Devices, vol. 44, iss. 10, pp. 1689-1698, Oct. 1997.

Axis Communications, "Axis 200+ and 240 Camera Server: User's Guide", www.axis.com/techsup/cam_servers/cam_240/index.htm, pp. 1-38, Jan. 1999.

Axis Communications, "Network Camera Developments Enable Live Web Imaging", Axis 2100 white paper, www.axis.com/products/videos/camera/documentation.htm, pp. 1-12, Nov. 1999.

Sinetica Corp., "Newsletter, Issue One 99", Sinetica, UK, www.sinetica.co.uk, Feb. 1999, XP002160504, 4 pp.

Sinetica Corp., "Netcom TH. Advanced SNMP Agent with Web Browser Support", Sinetica, UK, www.sinetica.co.uk, Apr. 2000, XP002160505, 2 pp.

Duran et al., "Virtual personal computers and the portable network," IEEE Proceedings of Inter. Performance, Computing, and Communications, IPCCC'99, p. 52-56, Feb. 1999.

Hochhauser, M., "Netbotz Wallbotz 400 is the next best thing to being there", CMP Media, Inc., Network Computing, v 13, n. 2, p. 1-2, Jan. 2002.

International Search Report from commonly owned International Application No. PCT/US00/29689, (dated Feb. 28, 2001).

International Preliminary Examination Report from commonly owned International Application No. PCT/US00/29689, (dated Jan. 18, 2002).

Office Action from commonly owned Canadian Patent Application No. 2,395,450, dated May 2, 2008.

International Search Report from commonly owned International Application No. PCT/US02/09179, (dated Aug. 22, 2002).

International Search Report from commonly owned International Application No. PCT/US02/09178, (dated Sep. 4, 2002).

International Search Report from commonly owned International Application No. PCT/US02/02326, (dated Jan. 10, 2003).

European Search Report from commonly owned European Patent Application No. EP 04 75 0067, (dated Apr. 24, 2007).

* cited by examiner

| | DATA | PARAMETER #1 | PARAMETER #2 | PARAMETER #3 | PARAMETER #4 |
|---|---|---|---|---|---|
| NETWORK APPLIANCE #1 | A | AA | BA | CA | DA |
| NETWORK APPLIANCE #1 | A | AB | BB | CB | DB |
| NETWORK APPLIANCE #1 | B | AC | BC | CC | DC |
| NETWORK APPLIANCE #1 | B | AD | BD | CD | DD |
| NETWORK APPLIANCE #1 | C | AE | BE | CE | DE |

FIG. 9A

| | DATA | PARAMETER #1 | PARAMETER #2 | PARAMETER #3 | PARAMETER #4 |
|---|---|---|---|---|---|
| NETWORK APPLIANCE #1 | A | AA | BA | EA | DA |
| NETWORK APPLIANCE #1 | A | AA | BB | EA | DB |
| NETWORK APPLIANCE #1 | B | AA | BB | EA | DC |
| NETWORK APPLIANCE #1 | B | AA | BD | CD | DD |
| NETWORK APPLIANCE #1 | D | AA | BE | CE | DE |

FIG. 9B

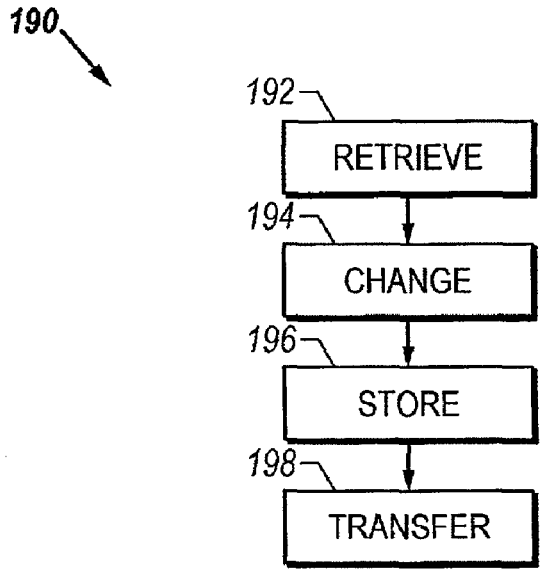

FIG. 10

|  | LOCATION | VALUE #1 | VALUE #2 | VALUE #3 | STATUS |
|---|---|---|---|---|---|
| NETWORK APPLIANCE #1 | A | AA | BA | CA | OFF |
| NETWORK APPLIANCE #1 | A | AB | BB | CB | ON |
| NETWORK APPLIANCE #1 | B | AC | BC | CC | ON |
| NETWORK APPLIANCE #1 | B | AD | BD | CD | ON |
| NETWORK APPLIANCE #1 | C | AE | BE | CE | ON |

FIG. 13A

|  | LOCATION | VALUE #1 | VALUE #2 | VALUE #3 | STATUS |
|---|---|---|---|---|---|
| NETWORK APPLIANCE #1 | A | AA | BA | CA | ON |
| NETWORK APPLIANCE #1 | A | AD | BB | CB | ON |
| NETWORK APPLIANCE #1 | B | AC | BC | CC | ON |
| NETWORK APPLIANCE #1 | B | AD | BD | CF | ON |
| NETWORK APPLIANCE #1 | C | AE | BE | CE | OFF |

FIG. 13B

|  | LOCATION | MODEL | VALUE #1 | VALUE #2 | STATUS |
|---|---|---|---|---|---|
| NETWORK APPLIANCE #1 | A | 100 | AA | BA | OFF |
| NETWORK APPLIANCE #1 | A | 100 | AB | BB | ON |
| NETWORK APPLIANCE #1 | B | 300 | AC | BC | ON |
| NETWORK APPLIANCE #1 | B | 400 | AD | BD | ON |
| NETWORK APPLIANCE #1 | C | 200 | AE | BE | ON |

FIG. 13C

METHODS FOR DISPLAYING PHYSICAL NETWORK TOPOLOGY AND ENVIRONMENTAL STATUS BY LOCATION, ORGANIZATION, OR RESPONSIBLE PARTY

RELATED APPLICATIONS

This application is a continuation of U.S. patent application Ser. No. 10/107,962, filed Mar. 27, 2002 entitled: "NETWORK APPLIANCE MANAGEMENT", which is incorporated herein by reference in its entirety.

U.S. patent application, Ser. No. 10/107,962, filed Mar. 27, 2002 entitled: "NETWORK APPLIANCE MANAGEMENT" is a continuation-in-part of U.S. patent application Ser. No. 10/057,563, now issued U.S. Pat. No. 7,159,022, filed Jan. 25, 2002 entitled: "METHOD AND SYSTEM FOR A SET OF NETWORK APPLIANCES WHICH CAN BE CONNECTED TO PROVIDE ENHANCED COLLABORATION, SCALABILITY, AND RELIABILITY", which claims priority of U.S. provisional Application No. 60/264,445, filed Jan. 26, 2001 entitled: "METHOD AND SYSTEM FOR A SET OF NETWORK APPLIANCES WHICH CAN BE CONNECTED TO PROVIDE ENHANCED COLLABORATION, SCALABILITY, AND RELIABILITY", both of which are incorporated herein by reference in their entireties.

U.S. patent application Ser. No. 10/107,962, filed Mar. 27, 2002 entitled: "NETWORK APPLIANCE MANAGEMENT" claims priority of U.S. provisional Application, No. 60/279,059, filed Mar. 27, 2001 entitled: "SENSOR PLAYBACK SYSTEM AND METHOD", which is incorporated herein by reference in its entirety.

U.S. patent application Ser. No. 10/107,962, filed Mar. 27, 2002 entitled: "NETWORK APPLIANCE MANAGEMENT" claims priority of U.S. provisional Application, No. 60/311,268, filed Aug. 9, 2001 entitled: "METHODS FOR DISPLAYING PHYSICAL NETWORK TOPOLOGY AND ENVIRONMENTAL STATUS BY LOCATION, ORGANIZATION, OR RESPONSIBLE PERSON", which is incorporated herein by reference in its entirety.

U.S. patent application Ser. No. 09/429,504, now issued U.S. Pat. No. 6,714,977, filed Oct. 27, 1999 entitled: "METHOD AND SYSTEM FOR MONITORING COMPUTER NETWORKS AND EQUIPMENT" is incorporated herein by reference in its entirety.

TECHNICAL FIELD OF THE INVENTION

This invention relates in general to a system and method for monitoring network equipment. More specifically, the invention relates to a system and method of monitoring network-enabled sensor equipment from a remote location.

BACKGROUND OF THE INVENTION

Data traffic on networks, particularly on the Internet, has increased dramatically over the past several years, and this trend will continue with the rapid growth of e-commerce and other services on the Internet requiring greater bandwidth. With this increase in data traffic on networks, there has been a corresponding increase in the number of computer equipment rooms, known as "server rooms," used to house the equipment necessary to support data traffic routing. Furthermore, the increasing dependency of companies on their Internet presence has created an urgency to keep the server rooms up and running at all times. Industry estimates show that there are over 400,000 such rooms currently in existence in the United States.

The growth in Internet traffic has prompted many businesses to construct a server room to allow their employees to access Internet information or enable e-commerce and store data. As such, continuous server up time has become important. Keeping track of numerous computers, along with associated bridges, routers, backup power supplies, etc., can be a formidable task. A large company with server rooms in more than one city might well be faced with spending thousands of dollars on software packages to keep their equipment running. Dedicated technicians are also needed to monitor network equipment and issue work orders to repair failed units.

While reliable, modern computer systems cannot tolerate excess heat, dust or humidity. Heat can rapidly cause equipment deterioration. Failure of cooling fans can reduce equipment lifetime to days or hours. A single high-speed LAN (local area network) failure can cause slow system response. These and other such failures within the equipment in a server room occur routinely and can cause great disruption to a business.

Typical solutions only permit inspection of devices on a local basis. Others permit a technician to inspect geographically diverse installations from a central console. However, all of these solutions are expensive to implement, complex, and difficult to maintain and train personnel to use them.

As a result, small to medium companies having small to medium networks are left in the position of requiring a means to monitor and maintain their computer network equipment from failing while not having the resources to afford the high-priced solutions. Many firms cannot afford a high-end solution or simply do not have the time and resources to train their IT personnel to learn and use complex systems. Instead, the typical monitoring method in many such companies is user complaints to the IT manager to indicate when a problem has occurred.

This is especially true for companies having multiple server rooms and that have concerns about routine access to each of these rooms. Additionally, concerns exist with current solutions regarding the manpower intensiveness of these solutions. Most network monitoring solutions can consume a full or part-time employee. The financial justification for these systems is, therefore, difficult because network equipment typically fails yearly or on a disaster basis, and the cost of recovery is seen as less than that of maintaining a full-time employee to routinely monitor the equipment.

Similar concerns exist for monitoring rack-mounted components. Typical problems include localized environmental excesses leading to failure. Another problem is theft. Typical monitoring solutions do not provide for video imaging of remote server locations over a network. Computer equipment is typically placed in server rooms for two reasons: security and environmental control. Remote video imaging of a server room over a network can provide for maintaining security of the equipment despite the lack of a physical presence on site.

A typical computer room can house hundreds of devices, ranging from expensive server grade computers to bridges, routers, uninterruptible power supplies and telephone equipment. A server room's environment requires monitoring because out-of-limit environmental variables can eventually affect the equipment in the room. For example, high temperatures, humidity (for example, from water leaks), or lack of airflow can detrimentally affect the equipment. Similarly, alarms, such as smoke and fire alarms, or the status of room openings, are important to determine. While the expense of replacing server room components if they fail is great, currently existing monitoring solutions are not cost effective for smaller-sized companies to implement despite the potential costs of such losses.

These typical monitoring systems use a centralized application. While these mechanisms can be quite effective, they introduce additional costs, through additional software, hardware, configuration, administration, and network bandwidth.

Beyond the application to server rooms and rack mountings of network equipment, various other monitoring systems suffer from the same failures and deficiencies associated with information accessibility, organization, and presentation.

As such, many typical network monitoring systems suffer from deficiencies in information accessibility, organization, and presentation. Many other problems and disadvantages of the prior art will become apparent to one skilled in the art after comparing such prior art with the present invention as described herein.

SUMMARY OF THE INVENTION

Aspects of the invention may be found in a system for remote monitoring of network appliances. The system may have a server. The server may be in communication with a network appliance. Further, the server may be in communication with the client machine. The server may function to download sensory data from the network appliance or appliances and store the information. Further, the server may function to upload configuration data to the network appliance or appliances.

In addition, the server may communicate with the client machine. The server may transfer software to the client machine. The software may permit the client machine to access sensory data on the server and to manipulate configuration data.

The server, network appliance, and client may communicate through an interconnected network. The interconnected network may be a global network, wireless network, wide area network, and local area network, among others.

Aspects of the invention may also be found in a server. The server may be in communication with the network appliances. Further, the server may be in communication with the client machine. A server may download information from the network appliances associated with sensor data. Further, the server may upload configuration data to the network appliances. A server may also supply software to the client machine. The software may enable the client machine to access data on the server, manipulate the data, display the data and change configuration data associated with the network appliances.

The server may also have map configuration data. These data may be transferred to the client machine and used to display data associated with the network appliances. Further, the data may be displayed as icons arranged on a display. These icons may be organized in a manner that represents physical location, status, and function, among others. Furthermore, these icons may be superimposed on a graphic element. The graphic element may be a map, an image, or a plot, among others.

The server may also function to store image data associated with the network appliances. The image data may be stored in a manner that associates the image data with other sensory data or sensory events occurring on the network appliances. The image data may be a still image, an infrared image or a movie, among others.

Aspects of the invention may also be found in a client machine and software operable to run on the client machine. The software may be acquired from the server. The software may enable the client machine to access information associated with the network appliances. This information may be sensory data and/or configuration data, among others. The software may also enable the client machine to display the data For example, the data may be displayed in the form of a map, a graph, or a table, among others. The software may also enable the client machine to manipulate data, map configuration data, and configurations associated with network appliances, among others. For example, the client may customize a map by specifying the organization of icons associated with network appliances and their data associated therewith. Alternately, the client may manipulate the access of other users to the map. The client may also manipulate configurations associated with network appliances by changing a parameter associated with several network appliances to a same value for each of the several network appliances. The client may also manipulate a graph, such that data associated with multiple sensors from multiple network appliances may be displayed. The client may also display image data associated with sensors and/or physical events associated with the network appliances.

Aspects of the invention may also be found in a map configuration data. The map configuration data may be automatically generated or configured by a client, among others. Further, the map configuration data may have restricted permissions such that the map may be viewable by one or few other users. Further, the map may have a configuration such that users are given varying permissions associated with viewing and changing the map. The map may also display icons super imposed over a background. For example, the background may depict a map of a physical location over which icons are displayed representing the physical location of an associated network appliance.

Further aspects of the invention may be found in a method for mass configuration of network appliances. The method may include changing a parameter associated with several network appliances to a same value for each network appliance. A client machine may perform the change. The change may then be stored on a server. A network appliance may then ping the server. The server may respond with new configuration data. Further, the network appliance may respond with a confirmation and the server may respond to the confirmation with additional data, if available.

Another aspect of the invention may be found in a graph. The graph may be a graph of data associated with network appliances. The graph may be displayed on client machine. Further, the graph may be associated with various sensors associated with multiple appliances. The sensors may be of a same type, a varying types or a combination of types, among others.

Further aspects of the invention may be found in an image. The image may be acquired from a image acquisition enabled network appliance. The network appliance may acquire the image in response to an event on another network appliance, or the same network appliance, or combinations of network appliances, among others. The image may be transferred to a server for storage. A server may store the image in a manner such that the image is associated with the event. Further, the image may be stored such that it is associated with a time the image was taken, the time of the event, or other factors. Further, the image may be associated with various network appliances.

As such, a system for remote monitoring of network equipment is described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 9A is a block diagram of an exemplary embodiment of a configuration of several network appliances as seen in FIG. 5;

FIG. 9B is a block diagram of another exemplary embodiment of a configuration as seen in FIG. 5;

FIG. 10 is a block flow diagram of an exemplary method for use by the system as seen in FIG. 1;

FIG. 13A is a block diagram of an exemplary embodiment of a display for use by the system of FIG. 4;

FIG. 13B is a block diagram of an exemplary embodiment of a display for use by the system as seen in FIG. 4;

FIG. 13C is a block diagram of a further exemplary embodiment of a display for use by the system as seen in FIG. 4;

Corresponding reference numerals indicate corresponding parts throughout the several views of the drawings.

DETAILED DESCRIPTION OF THE PREFERRED EMBODIMENT

Figure 1:
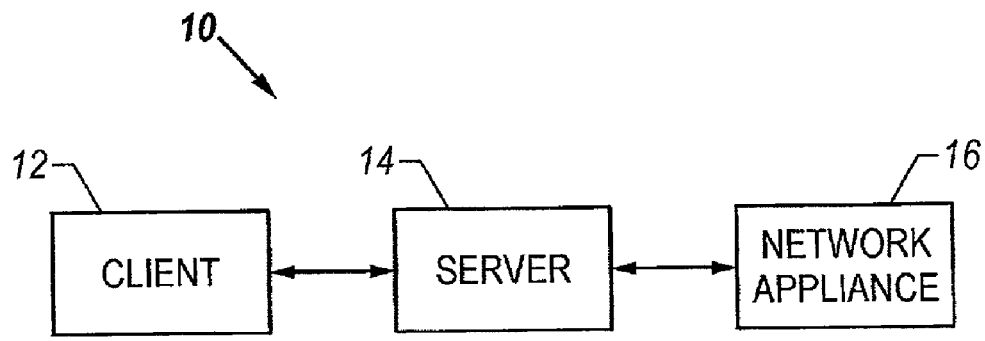
FIG. 1 is a schematic block diagram of a system, according to the invention.

FIG. 1 is a schematic block diagram of the system according to the invention. The system 10 has a server, a client 12 and a network appliance 16. The server 14 is connected to one or more network appliances 16 through an interconnected network. The server 14 may function to transfer sensor data from the network appliance 16 and transfer configuration data to the network appliances 16. The server 14 is also connected to a client machine 12. The client machine 12 may access, display and/or manipulate data stored on the server 14. In this manner, the client 12 may remotely monitor network appliances 16 and the client 12 may reconfigure the network appliances 16.

The client 12 may be connected to the server 14 through an interconnected network. Further, the server 14 may be connected to the network appliance 16 through an interconnected network. The interconnected network may take various forms. These forms may include a global network, wide area network, local area network, wireless network, phone systems, and satellite communications systems, among others. Further, these networks and systems may use various method, protocols, and standards, including, among others, ethernet, wireless ethernet, TCP/IP, HTTP, FTP, SNMP, Blue Tooth, and others. In addition, various security methods may be used in transferring data, including SSL, among others. Further, a user-controlled level of security may be provided. A standard protocol may allow the client and server to be physically located on separate sides of a firewall, adding another level of security to the customer.

In addition, the client 12 may acquire instructions for accessing, displaying and manipulating data from the server 14. These instructions may also be transferred by the server from the server 14 on an as needed basis.

In one exemplary embodiment, the server 14 may communicate with one or more network appliances 16. The one or more network appliances 16 may be located in a server room. The one or more network appliances 16 may have sensors for sensing environmental conditions and security states of the server room.

For example, the network appliances 16 may collect data associated with temperature, humidity, door sensors, alarms, power quality, motion detectors and cameras, among others. The network appliances 16 may, for example, communicate with the server 14 through hypertext transfer protocols. In one exemplary embodiment, the network appliances 16 are connected to an interconnected network, such as a local area network, wide area network global network, and wireless network, among others. The network may, for example, use a TCP/IP protocol communications method. The network appliances 16 may, for example, communicate with the server 14 using a hypertext transfer protocol.

For example, the network appliances 16 may ping a server 14 with an HTTP method communication. The server 14 may respond to that HTTP ping method communication with data associated with the configuration of the network appliance 16. Alternately, the network appliances 16 may use the HTTP method communication to transfer data to the server 14. In one embodiment, the network appliance 16 may use an HTTP Post method to send information relating to alarms and alerts. Some alarms and/or alerts may have associated image data which may be stored on the server 14. Furthermore, the server may associate the image data with the alert. Alerts delivered via HTTP Posts may allow other appliances to communicate and deliver information to servers that cannot initiate communications with the Appliances, for example, due to firewalls or intermittent network connectivity. This approach may provide superior reliability, security, and connectivity to conventional SNMP alert delivery.

The HTTP Post method may also be used to implement periodic posting of data from the network appliance to the server. The end-user may also configure appliances to periodically deliver their sensor data to the present invention, "pushing" the data to the server instead of having the server "pull" the data from the appliance. This mechanism allows the server to collect and record data from appliances that it is not capable of initiating communications with, such as appliances located behind a fully blocking firewall to inbound network requests. The delivery of this data may be set to require a user-id and password, allowing the present invention to authenticate the delivered data. The same transactions used for communicating the current sensor values and states may be used to verify status. If the delivery of the data is significantly overdue (i.e. by some period of time, or some number of scheduled Posts are missing), the Server will declare the Appliance "offline" or "missing in action".

In another embodiment, the server 14 may communicate with the network appliance 16 using an HTTP Get call. However, the server 14 and network appliances 16 may use various communications methods. These methods may include file transfer protocol, hypertext transfer protocol, SNMP, among others. Further, the communications may include messages associated with HTML, XML, HTTP post, HTTP get, compressed data, and image data, among others. The communication may occur on intervals. These intervals may be fixed periodically, vary with date or time, be adjustable, or any combination, among others. In addition, timeouts and retries may be configured.

Further, the server may attempt to find network appliances through discovery. For example, the server may attempt to communicate with each possible address in a given IP address range. In addition, it may attempt to communicate with each of a specified set of ports that the user has configured the HTTP servers on their appliances to use.

The ability to schedule a discovery or collect environmental sensor data during a control window makes life easier for network administrators to reduce network management traffic during peak hours. This approach may allow the user to configure which days of the week to scan for their appliances, as well as what time of day to do the scan. This feature may also allows the user to find appliances located at network sites that are only "dialed up" during certain scheduled times of days, without wasting time and effort attempting to discover them when they are not connected to the central site.

The present invention supports an arbitrary number of discovery policies, allowing discovery to be fine-tuned for multiple sites and different customer policies.

The system may also support "discovering" appliances by handling Appliance-initiated HTTP Posts. When an Appliance issues a Post to the Server, the server will determine if the Appliance is one already managed by the Server. If not, the Appliance will be automatically added, either unconditionally or if it meets certain criteria configured by the user (i.e. only devices on certain subnets, certain models, or matching membership criteria for certain Groups (see 3.9)). The Server's response to the Post may be used to tell the Appliance how often to check-in in the future (if it is accepted) or to not Post again in the future (if it is rejected), among others.

The server 14 may communicate with a client machine 12. For example, the client machine 12 and server 14 may be coupled to an interconnected network. The interconnected network may take various forms. These forms may include global networks, local area networks, wide area networks, wireless networks, phone switching networks, and others. Further, these networks may use various protocols, such as TCP/IP.

In one exemplary embodiment, the client machine 12 may communicate with the server 14 using hypertext transfer protocols. For example, the client machine 12 may have a web browser that communicates with the server 14. The web browser may be a JAVA enabled browser. For example, a JAVA enabled browser may download an applet from the server 14. The applets may enable the client machine to access, display, and/or manipulate data stored on the server 14. For example, the client machine 12 may be able to access information associated with sensor data, configuration data, image data, network appliance status, and map configuration data, among others. In one exemplary embodiment, the client machine 12 may query the server using SQL to retrieve the desired data However, various other methods may be used to retrieve data.

The client machine 12 may then display the data in various formats including tables, maps, and graphs, among others. Furthermore, the client 12 may, in one exemplary embodiment, dynamically load JAVA programming object classes for viewing, accessing, and/or manipulating various data. Most of the HTTP replies returned from the server are in plain ASCII text. However there are several situations where binary transfers of Java Objects are far more efficient. For these scenarios, a Network Class Loader may be implemented so the server can create complex return-objects for the client. Since the client may be relatively small, a mechanism may provide the underlying Object code to the client before it receives the Object itself. The Network Class Loader is that solution. In other words, the client can make a request to the server and receive both an Object containing data, and the code necessary to decode and execute the returned Object within the client's application environment.

This feature may further enhance the ability of third-party developers (both end-user and ISVs) to extend the present invention, since the definitions of these interfaces and the classes returned can be published without requiring the ISV to include potentially obsolete versions of the class implementations in their delivered code (since the up-to-date versions will be served to the application from the present invention using the Network Class Loader). For compression purposes, returned objects from the server may utilize the Object serialization standard put forth by Sun Microsystems in the Java Runtime Environment.

The client machine 12 may also manipulate and organize data. In one exemplary embodiment, the client machine 12 may establish dynamic groups, organized by chain of command, business infrastructure, or physical location, among others. These groups may be displayed in a tree structure. Further, these groupings may, for example, be implemented using dynamically created queries.

However, the client machine may have various embodiments. Furthermore, the client machine may communicate with the server 14 through various protocols. These protocols may include FTP, HTTP, SNMP, among others. In an alternate embodiment, the client machine 12 may contain software. The software may be functional to acquire and load various programming objects and classes. The software may also be written in various languages such as JAVA, C++, Visual Basic, among others.

The server 14 may also communicate to the client machine 12 an alert associated with storage capacity. Further, the server 14 may implement automated backup.

Figure 2A:
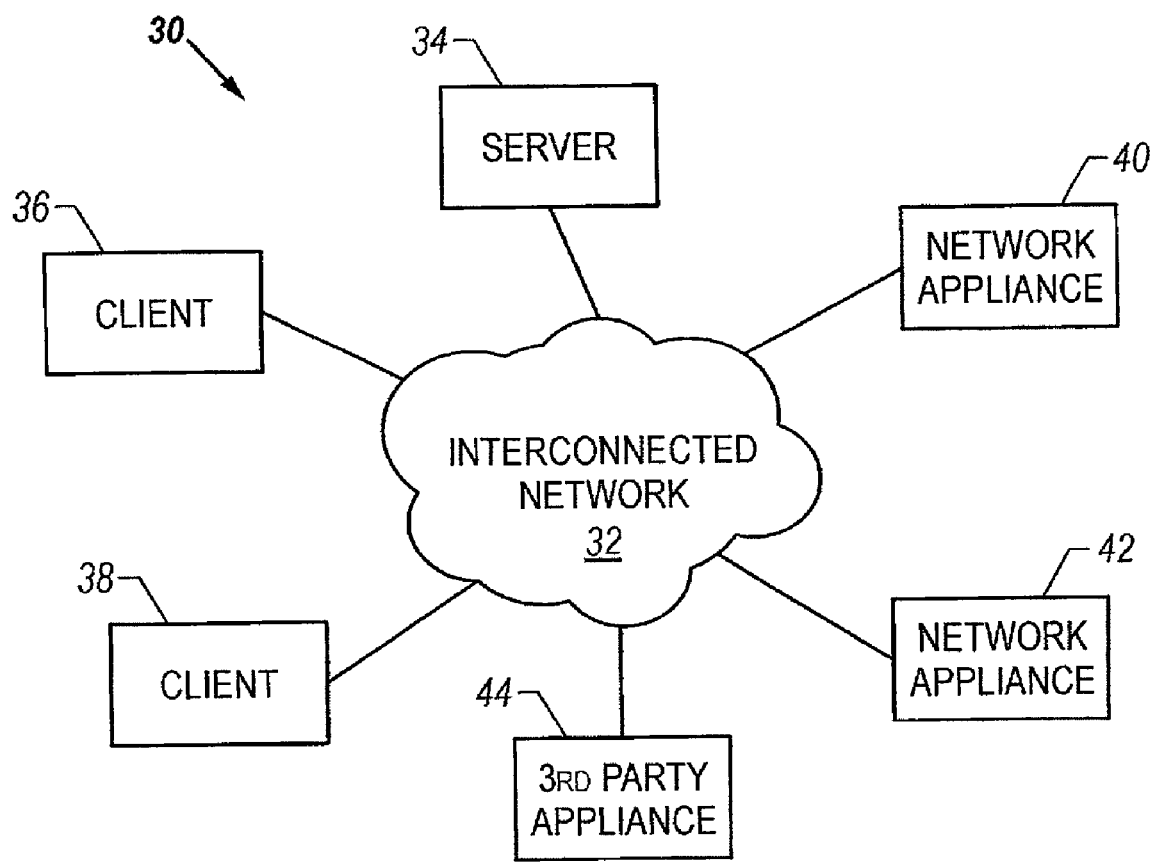
FIG. 2A is a schematic block diagram of an exemplary embodiment of the system as seen in FIG. 1.

FIG. 2A is a schematic block diagram of an exemplary embodiment of the system as seen in FIG. 1. The system 30 may have a server 34 connected to an interconnected network 32. In addition, the system 30 may have client machines 36, 38, network appliances 40, 42, or third party appliances 44 connected to a network 32, among others. The server 34 may function to store information associated with the network appliances. This information may include sensor data, configuration data, image data and map configuration files, among others. The data or information may be down loaded by the server 34 from the network appliances 40, 42. Alternately, the network appliances 40, 42 may transfer data or information to the server 34 through the interconnected network 32.

Furthermore, the server may acquire data from a third party appliance 44 through the interconnected network 32. A server 34 may store, group and organize the information and data. Further, the server may supply the information to one or more client machines 36, 38, through the interconnected network 32.

One or more client machines 36, 38, may communicate with the server 34 through an interconnected network 32. The clients 36, 38 may access data, display, and manipulate data, among others. Furthermore, the clients 36, 38 may acquire instructions and/or programs associated with accessing the data from the server 34.

However, the server 34, the network appliances 40, 42, the third party appliance 44 and the clients 36, 38 may or may not be connected to the same interconnected network. Moreover, these elements may be configured separately, together, or in various combinations, among others.

Figure 2B:
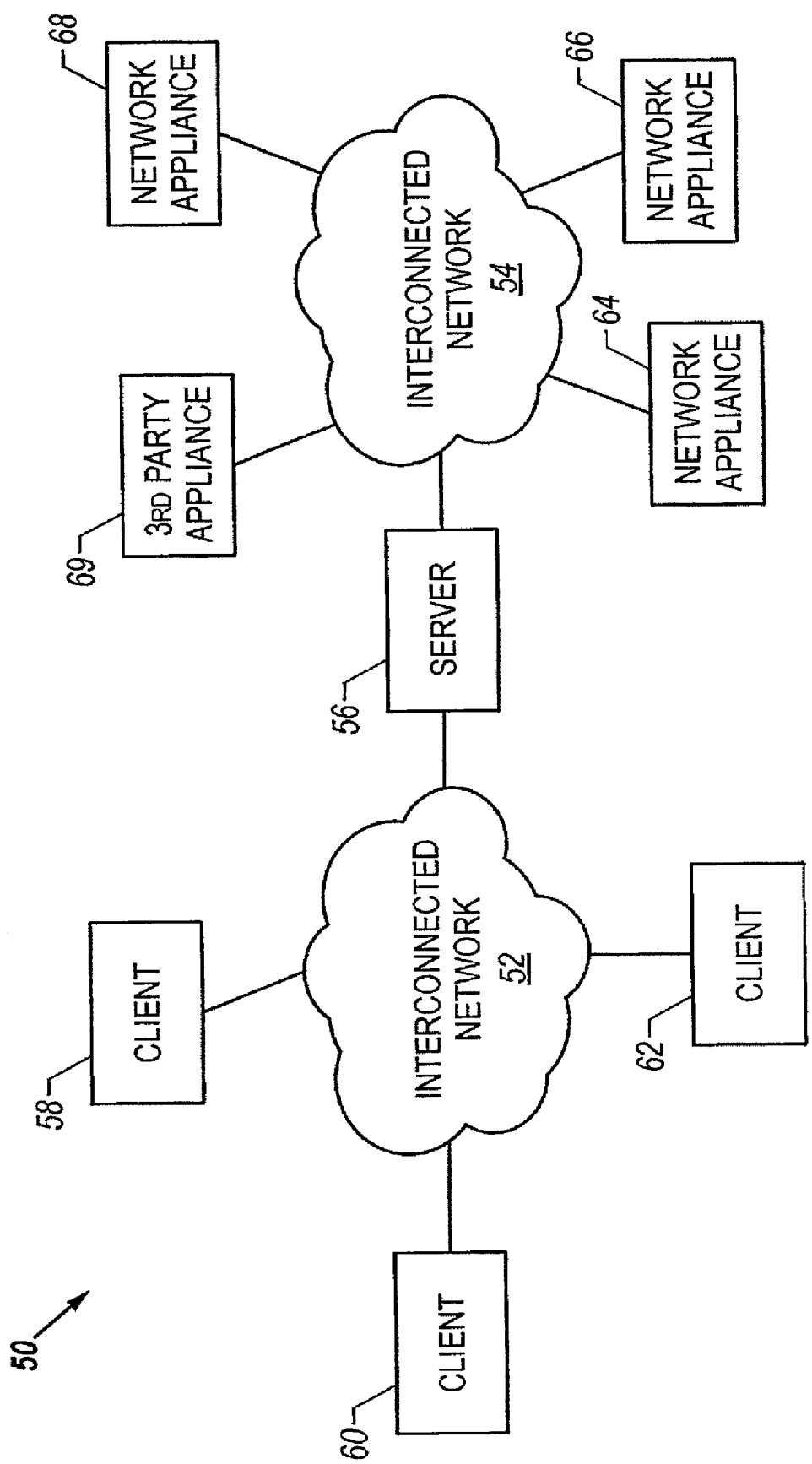
FIG. 2B is another schematic block diagram of another exemplary embodiment of the system as seen in FIG. 1.

For example, FIG. 2B is a schematic block diagram of an exemplary embodiment of the system as seen in FIG. 1. The system has a server connected to two interconnected networks 52, 54. The interconnected network 52 also connects to client machines 58, 60, and 62. The interconnected network 54 may connect to one or more network appliances 64, 66, 68, and/or third party appliances 69. A server 56 may transfer information to and from the one or more appliances 64, 66, 68 and/or the third party appliances 69 through the interconnected network 54. This information may be sensor data, configuration data, and images, among others.

The server 56 may store the information and supply that information to client machines 58, 60, 62. The client machines 58, 60, 62 may, for example, access, display and/or manipulate the data associated with the network appliances 64, 66, 68 and third party appliances 69. Further, the client machines 58, 60, 62 may acquire from the server 56, instructions, objects, classes, and programs, among others, for accessing, displaying and manipulating the data associated with the network appliances 64, 66, 68 and third party appliances 69, as stored on the server 56.

Figure 2C:
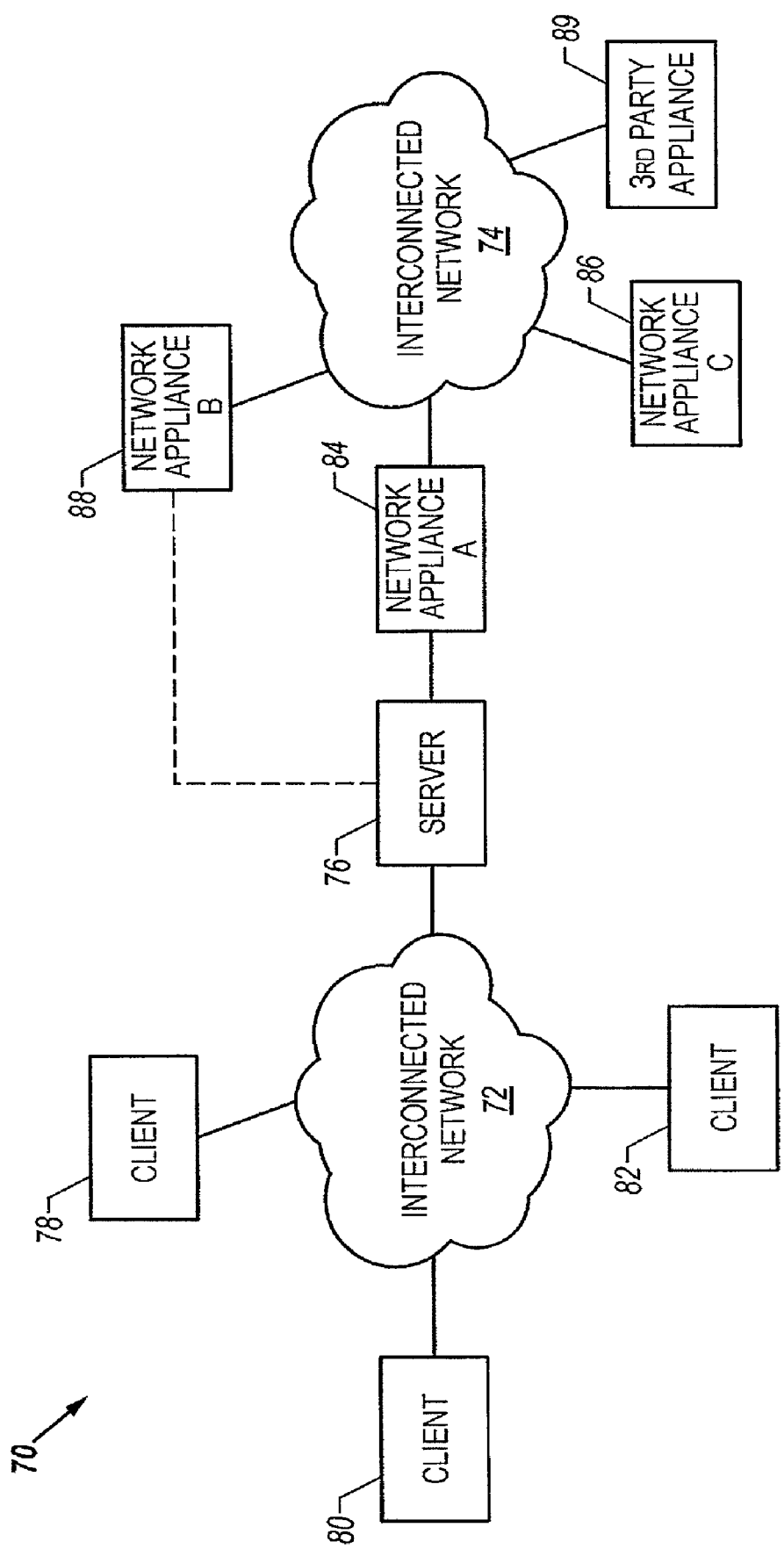
FIG. 2C is a schematic block diagram of a further exemplary embodiment of the system as seen in FIG. 1.

Further, FIG. 2C is a schematic block diagram of a further exemplary embodiment of the system as seen in FIG. 1. The system 70 has a server 76. The server 76 may be connected to a network appliance A 84 or optionally connected to a network appliance B 88. Network appliance A 84 and network appliance B 88 may be connected to an interconnected network 74. In addition, network appliance 86 and a third party appliance 89 may be connected to the interconnected network 74. The server 76 may be connected to the network appliance A 84 through various means. These means may include a global network, wide area network, local area network, wireless network, phone systems, and satellite communications systems, among others. Further, these networks and systems may use various method, protocols, and standards, including, among others, ethernet, wireless ethernet, TCP/IP, HTTP, FTP, SNMP, Blue Tooth, and others.

In addition, the server 76 may be connected to network appliance B 88 through various means. These means may include a global network, wide area network, local area network, wireless network, phone systems, and satellite communications systems, among others. Further, these networks and systems may use various method, protocols, and standards, including, among others, ethernet, wireless ethernet, TCP/IP, HTTP, FTP, SNMP, Blue Tooth, and others.

Moreover, the server 76 may be connected to network appliance A 84 and network appliance B 88 through the same, different, or various combinations, among others, of interconnected communication methods.

In addition, the server 76 may be connected to one or more client machines 78, 80 82 through an interconnected network 72. The client machines 78, 80, 82, may, through the interconnected network 72, access, display, and manipulate data associated with the network appliances 84, 86, 88 and/or third party appliances 89 as stored on the server 76. Furthermore, the client machines 78, 80, 82 may acquire from the server 76, instructions, objects, and classes, among others, for accessing, displaying and manipulating data as stored on the server 76.

The server 76 may store data associated with the network appliances 84, 86, 88 and third party appliances 89. This information may include sensor data, configuration data, map configuration data, groupings and associations, accessibility information, and image data, among others. The server, may, for example, communicate with network appliance A 84 to transfer the data. Alternately, the server 76 may communicate with network appliance B 88 to transfer the data. In one exemplary embodiment, network appliance A 84 may act as an intermediate between network appliances 86, 88, third party appliances 89 and the server 76. Network appliance A 84 may function as an intermediary by storing a directory of data, acting as a proxy, or acting as a data reciprocal, among others.

However, the elements as seen in FIGS. 2A, 2B and 2C may configured in various combinations, together or separate, among others. As such, various configurations may be envisaged.

The client machine may connect to a server to acquire data. The data may change or fluctuate dynamically on the varying conditions at a network appliance. Various methods may be used to update the data as displayed on the client machine. For example, the client machine may stay connected to the server continuously. However, continuous connection to the server may represent a burden to the network. Alternately, the client machine may periodically download updates from the server. However, the data integrity as displayed on the client machine may suffer, as changes to the data on the server may not be seen on the client machine.

Figure 3A:
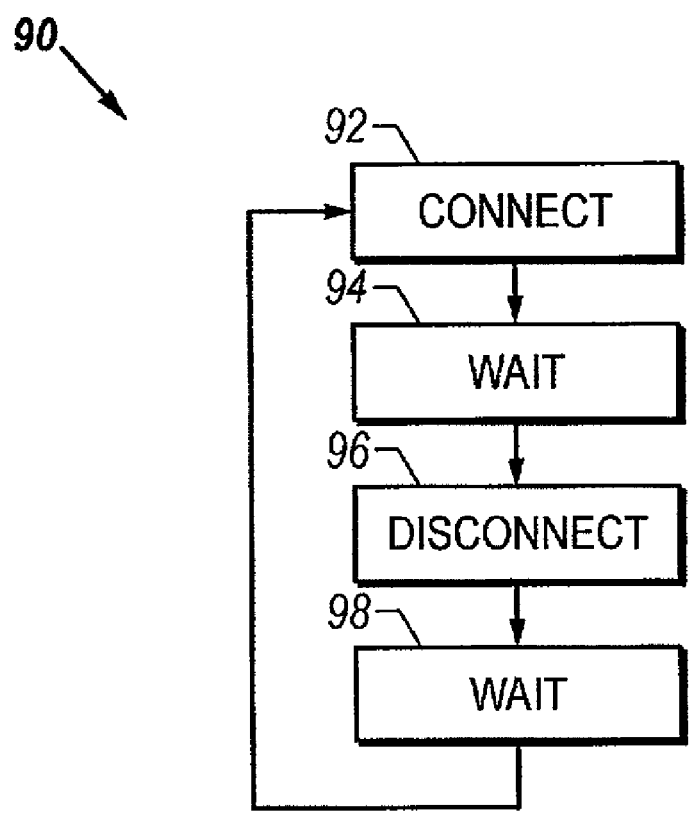
FIG. 3A is a block flow diagram of an exemplary method for use by the system as seen in FIG. 1.

In another embodiment, combinations of these methods may be used. For example, FIG. 3A shows a method for communicating between the client and server. In this exemplary method 90, the client may connect to the server as seen in a block 92. The client may wait and acquire data updates as they occur as seen in a block 94. The client may then disconnect as seen in a block 96. During this time, the data displayed may not be updated by the server. The client may then wait for a period of time as seen by a block 98 and reconnect. In this manner, while connected, the data integrity will be maintained. However, periodic disconnection will improve network communications or decrease network load. The periods of connecting and disconnecting may be constant, manipulated, or fluctuate with activity or demand. For example, during periods of low activity, the disconnect period may be increased. Alternately, during periods of high activity, the connect period may be increased. Furthermore, these periods may be changed in response to user interaction, user activity, and network appliance activity, server activity, among others.

The client may connect using various methods and protocols, among others. Alternately, the client may use a ping method or various GET or POST methods to contact the server at varying intervals. These intervals may be increased or reduced to simulate a connection or wait period.

Figure 3B:
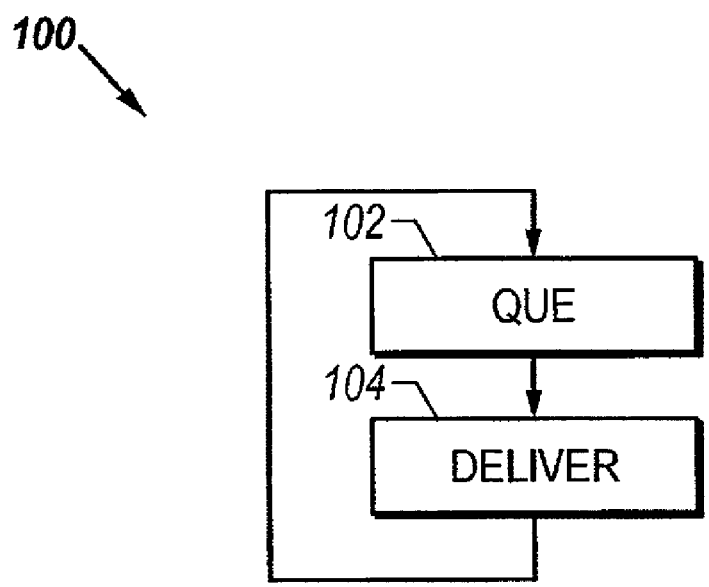
FIG. 3B is a block flow diagram of an exemplary method for use by the system as seen in FIG. 1.

In response, the server may alter its approach to collecting and transferring data. For example, FIG. 3B shows a block flow diagram of an exemplary method for use by the server. The method 100 involves cueing data as seen in a block 102 when the client machine is disconnected. Then, data is automatically delivered, as seen in a block 104, when the client machine is connected. However, various other embodiments may be envisaged for communicating between the client and the server.

Figure 4:
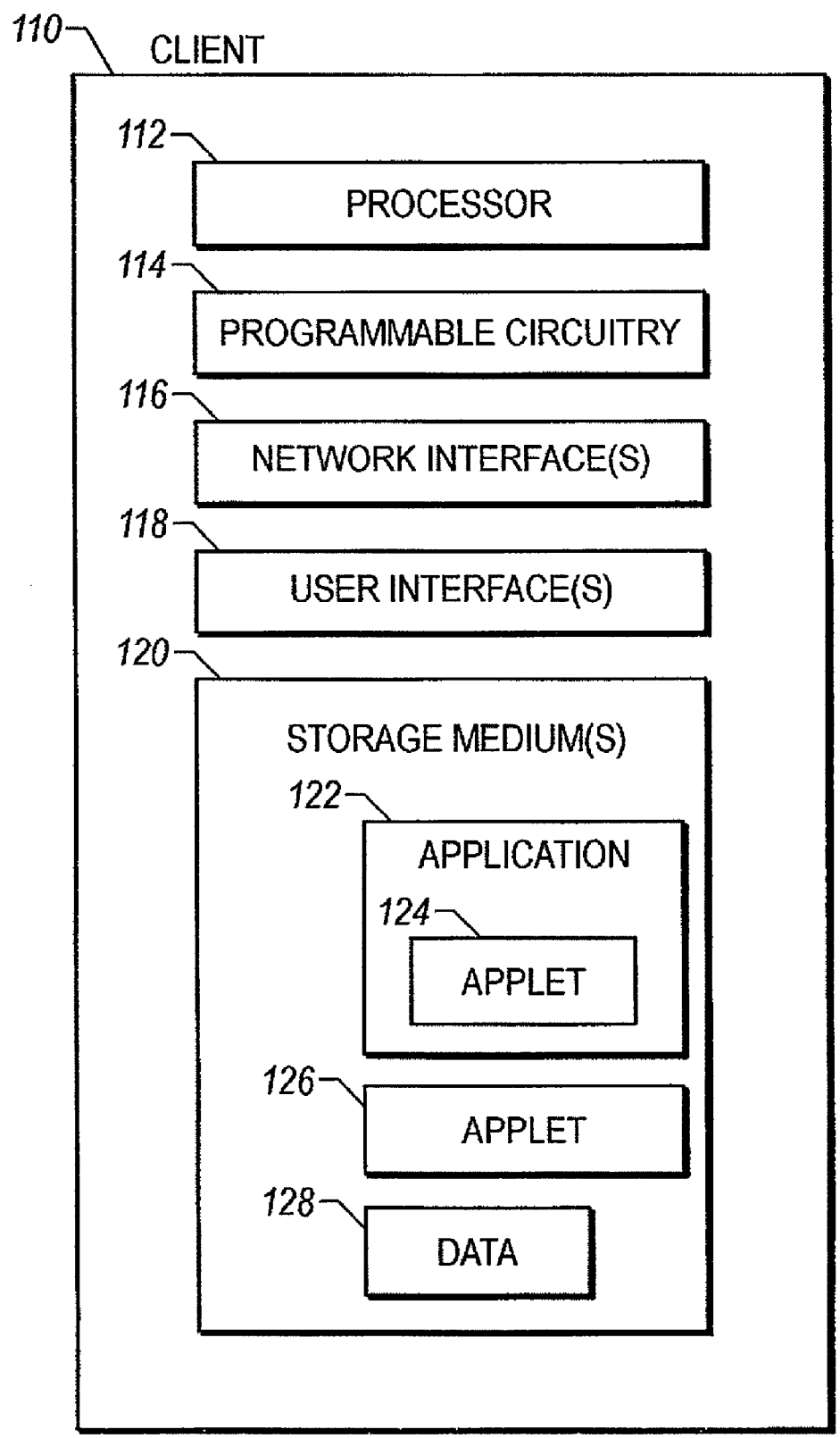
FIG. 4 is a block diagram of an exemplary embodiment of the client as seen in FIG. 1.

FIG. 4 shows an exemplary embodiment of a client machine as seen in FIG. 1. The client machine 110 may have a processor 112, programmable circuitry 114, one or more network interfaces 116, one or more user interfaces 118, and storage mediums 120, among others. A storage mediums 120 may store application data. Further the storage mediums may store downloaded data and information 128. However, the client 110 may have various configurations. These elements may or may not be included. Further, these elements may be separate, together, or in various combinations, among others.

The processor 112 may function to interpret the instructions and application data. The processor may take various forms. These forms may include CPUs, embedded processors, JAVA enabled processors, and various computational circuitry, among others. Further, the processor may operate with an operating system such as Windows 95, Windows 98, Windows 2000, Windows ME, Windows NT, Windows CE, Linux, Unix, BSD, MacOS 9.x, MacOS X, Sun OS, PALM, or a Java-based operating system, among others.

The programmable circuitry 114 may take various forms. These forms may enable a user to program the client machine 110 using various interfaces such as a keyboard, mouse, network, drive, and handheld circuitry, among others.

The network interfaces may take various forms. These forms may include various circuitry for communicating through ethernet, wireless ethernet, Blue Tooth, phone lines, and modems, among others.

User interfaces may take various forms. These forms may include monitors, keyboards, wireless devices, handheld devices, and a mouse, among others.

The storage mediums 120 may take various forms. These forms may include hard drives, floppy drives, removable drives, cards, CD-ROM, CD-RW, CD-R, DVD, DVD-R, DVD-RW, RAM, and flash memory, among others.

The storage mediums 120 may store various applications 122, applets 126 and or data 128. The client 110 may function, for example, to access, display and manipulate data stored on a server and associated with network appliances. The client may use installed applications to access, display and manipulate the data. Alternately, the client may download applications, applets, and object classes, among others, to access, display, and/or manipulate the data. Furthermore, the client may use various combinations of installed and downloaded application, applets, object classes, among others.

The applications, applets, object classes may take various forms. These forms may include internet browsers, stand alone applications, interpreters, libraries, and instruction sets, among others.

In one exemplary embodiment, the client may connect to a server through a network interface 116. The client may have a JAVA enabled web browser. The web browser may function to acquire an applet from the server through the network interface 116. The applet may function to enable access to the data, display the data in various forms, and enable manipulation of the data. The client may manipulate data on the server to alter map configurations, network appliance associations, accessibility and permission information, annotate data associated with events, and network application configuration data, among others.

Further, the applet or applets may also function to permit changing and/or manipulation of configuration data associated with network appliances. For example, one or more parameters associated with one or more network appliances may be changed. A parameter associated with several network appliances may be changed to a same value for each network appliance. Alternately, a single value may be changed associated with a single parameter of a single network appliance. Furthermore, configuration settings may be uploaded to the server for future implementation on the network appliances.

The applet or applets may enable the client machine to display data. For example, the applet or applications may display a map. The map may have icons associated with the network appliances. Further, these icons may be used to display representations of the data. These icons may also be superimposed on a graphic, image, map or plot, among others. Further, the icons may be arranged according to type, location, alarm state, configuration, parameter value, or organization, among others. Alternately, the applications or applets may display the data as a table. For example, the table may display a current value of a parameter associated with a sensor on or connected to a network appliance. Alternately, the table may display alarm states associated with network appliances. Further, the table may display configuration parameters and data associated with network appliances. The table may further enable manipulation and changing of the values within the table. Alternately, the data may be displayed in graphical forms. These graphs may additionally offer the ability to chart data associated with one or more sensors associated with one or more network appliances. However, various other display methods may be envisaged. The applications or applets may also function to dynamically download data objects, classes, program elements, useful for accessing, displaying and/or manipulating new data elements. For example, a network class loader may be implemented in an application or applet such that new data classes may be implemented. These may, for example, be written in JAVA.

The applications and/or applets may also function to display image data. The image data may, for example, be associated with events, network appliances, and sensor data, among others. The applet or applets may display the image data in association with the events, network appliances, and/or sensor data.

In one exemplary embodiment, the client machine 110 may be a personal computer running an operating system such as, for example, Windows 2000. The client machine 110 may have an browser such as Internet Explorer 6.0 and be Java enabled.

In another exemplary embodiment, the client machine may be a handheld device with an operating system such as PALM or WINDOWS CE and be Java enabled. However, various devices may be envisaged. In addition, various operating systems and computer languages may be used.

In this manner, a client machine 110 may have fully functional access to information stored on the server and associated with network appliances. Further, the client may function to view, create, and manipulate groupings of network appliances. The client machine 110 may function to establish permissions to groupings.

Figure 5:
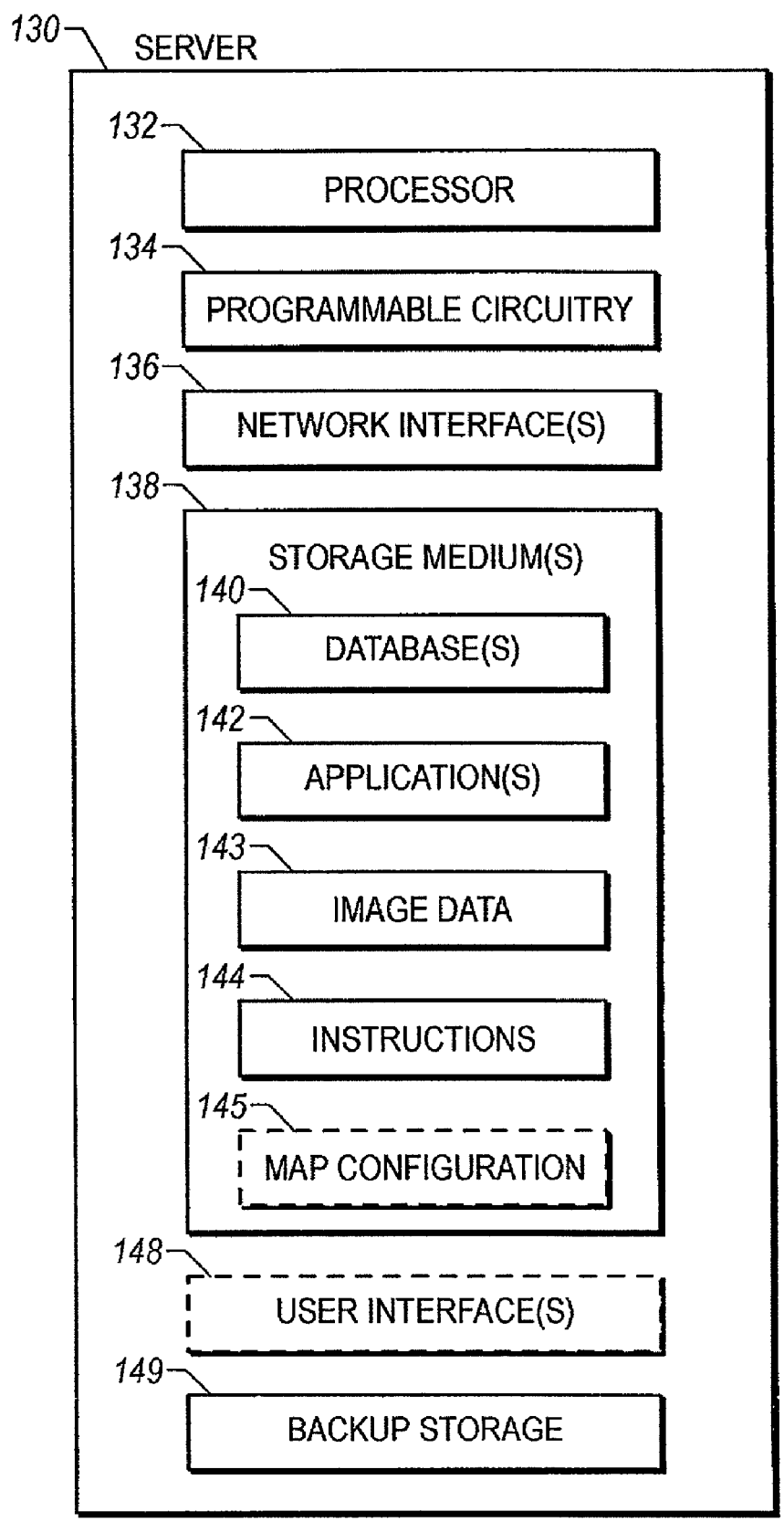
FIG. 5 is a block diagram of an exemplary embodiment of the server as seen in FIG. 1.

FIG. 5 is a block diagram of an exemplary embodiment of a server as seen in FIG. 1. A server 130 may have a processor 132, programmable circuitry 134, network interfaces 136, and storage mediums 138 and user interfaces 148. A storage medium 138 may hold databases 140, applications 142, instructions 144 and map configuration data 146. However, these element may or may not be included. Further, these elements may be separate, together, or in various combinations, among others.

A processor 132 may take various forms. These forms may include CPUs, embedded processors, JAVA enabled processors, and various computational circuitry, among others. Further the processor 132 may operate using an operating system such as Window 2000, Windows NT, Linux, BSD, UNIX, Mac OS X, Mac OS 9.x, or a Java-based operating system, among others.

A programmable circuitry 134 may take various forms. These forms may enable a user to program the server 130 using various interfaces such as a keyboard, mouse, network, drive, and handheld circuitry, among others.

A network interfaces 136 may take various forms. These forms may include various circuitry for communicating through ethernet, wireless ethernet, Blue Tooth, phone lines, and modems, among others.

Storage mediums 138 may take various forms. These forms may include hard drives, floppy drives, removable drives, cards, CD-ROM, CD-RW, CD-R, DVD, DVD-R, DVD-RW, RAM, and flash memory, among others.

The storage mediums 138 may hold databases 140, applications 142, instructions 144 and map configuration data 146. The databases 140 may take various forms. These forms may include Oracle databases, SQL compatible databases, Jet databases, generic databases, tables, and spreadsheets, among others. The map configuration data 146 may also be stored in a database 140. The instructions 144 may take various forms. These forms may include compiled code, interpreted code, Java code, Visual Basic code, C++ code, HTML code, PHP code, and Perl, among others.

The user interfaces 148 may take various forms. These forms may include monitors, keyboards, wireless devices, handheld devices, and a mouse, among others.

The server may function to download data from network appliances through the network interfaces 136. The data may, for example, be stored in the databases 140. This data may be sensory data, configuration data, image data, among others. Further, the server may include applications and instructions for communicating with the network appliances.

A server 130 may also function to communicate with one or more client machines through the network interface or interfaces 136. The server 130 may transfer applications 142 to the client machine. These applications and instructions may enable the client machine 110 to retrieve, display, and/or manipulate data. These applications may also be delivered in parts, classes, or software objects on an as needed basis.

In one exemplary embodiment, a client machine may request an application from the server. The server may deliver at least part of the application to the client machine. For example, a browser on the client machine may request a Java applet. The Java applet may enable the client machine to access, display and manipulate data. For example, the applet may enable the client to organize and group network appliance data, develop user groups, change user access information, display maps, manipulate icons and map features, change network appliance configurations, display alarms, and annotate data, among others. Further, the client machine may store information on the server.

For example, the server may deliver an application enabling the client to access the database and display image data associated with a camera enabled network appliance. Alternately, the server may deliver a part of an application enabling the client to display a table of network appliances and their associated parameters such as a value of a sensor or an alarm state, among others. Further, the server may deliver a part of an application which displays a tree of network appliances associated into groups.

The server may also deliver an application and associated map configuration data. The application may enable the client to access and display a map. The map may have icons superimposed on a background image. The icons may represent network appliances or groupings of network appliances. Further, the icons may link to present or historical values of the network appliances associated with the icons. In addition, an action such as clicking an icon may initiate another display such as another map, table, or graph. The icons may have an appearance indicative of type, capabilities, status, alarm state, present or historical value of a parameter or sensor output, or responsible party, among others. The icons may be arranged in a manner indicative of physical location, type, capabilities, status, alarm state, present or historical value of a parameter or sensor output, or responsible party, among others. Moreover, the background image may be a picture, video image, graph, contour plot, and vector plot, among others. The application may also enable the client machine to manipulate user access data stored on the server. The application may also enable the client machine to store map configuration data on the server 130.

Figure 6:
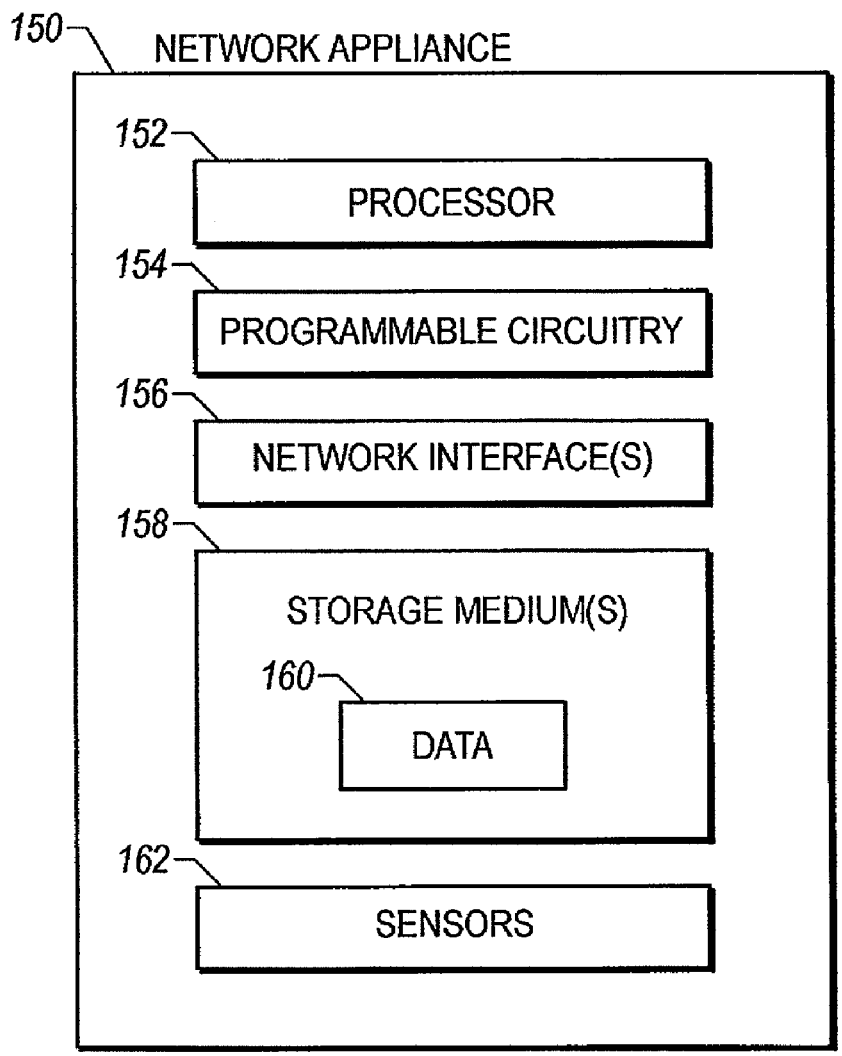
FIG. 6 is a block diagram of an exemplary embodiment of a network appliance as seen in FIG. 1.

FIG. 6 is a block diagram of a network appliance, for use in the system as seen in FIG. 1. The network appliance 150 may have a processor 152, a programmable circuitry 154, one or more network interfaces 156, one or more storage mediums 158, and one or more sensors 162, among others. The storage medium 158 may hold data 160, among others. However, these elements may or may not be included. Further, these elements may be separate, together, or in various configurations, among others.

The processor 152 may take various forms. These forms may include CPUs, embedded processors, JAVA enabled processors, and various computational circuitry, among others.

The programmable circuitry 154 may take various forms. These forms may enable a user to program the network appliance 150 using various interfaces such as a keyboard, mouse, network, drive, and handheld circuitry, among others.

The network interfaces may take various forms. These forms may include various circuitry for communicating through ethernet, wireless ethernet, Blue Tooth, phone lines, and modems, among others. Further, the network interface may enable the network appliance to connect to various networks including global networks, LANs, WANs, phone networks, page networks, satellite communication systems, and wireless networks, among others. The network interface may enable communication between the network appliance 150 and a server and/or other network appliances. Further, the network interface may enable the use of various methods, protocols, and standards, included HTTP, FTP, SNMP, TCP/IP, LDAP, and others.

The storage mediums 158 may take various forms. These forms may include hard drives, floppy drives, removable drives, cards, CD-ROM, CD-RW, CD-R, DVD, DVD-R, DVD-RW, RAM, and flash memory, among others. Further, the storage medium may store data associated with network appliance configuration, sensors, user access, other network appliances, and algorithms, among others.

The sensors 162 may take various forms. These forms may include temperature sensors, pressure sensors, airflow sensors, alarm sensors, dry contact sensors, humidity sensors, cameras, video cameras, infrared cameras, power quality sensors, data traffic sensors, acoustic sensors, and motion sensors, among others.

The network appliance 150 may function to communicate with the server. The communication may, for example, take the form of a ping, an HTTP GET, an HTTP POST, a SNMP message, an email message, or an FTP command, among others. With the communication, the network appliance may upload data, download configuration and/or accessibility settings, download program information, and indicate status. The communication may also use various security protocols and methods. Alternatively, the network appliance 150 may communicate with another network appliance acting as an intermediary between the server and the network appliance 150. As such, the information above may be exchanged between the network appliance 150 and the other network appliance acting as the intermediary. In both cases, the network appliance may deliver data on a schedule, as it is available, in response to a request, in response to an alarm, or in other manners. Further, the data may be formatted in various protocols including HTTP or FTP, among others.

The network appliance 150 may also communicate with other network appliances in a cluster. The cluster of network appliances may use various means for communication including HTTP, SNMP, and FTP, among others. The cluster may also establish relationships, a directory, and share resources, among others.

In one exemplary embodiment, the network appliance may collect image data in response to an open door alarm or motion alarm. The network appliance 150 may then upload the data to a server. The server may then provide the image and the alarm data to a client machine.

In another exemplary embodiment, a client machine may request temperature data from the server, the server may collect the data from the network appliance 150. The server may then forward the data to the client machine.

In a further example, the client machine may alter configuration data. The data may be stored on the server. The network appliance 150 may retrieve the configuration data from the server and adapt.

Figure 7:
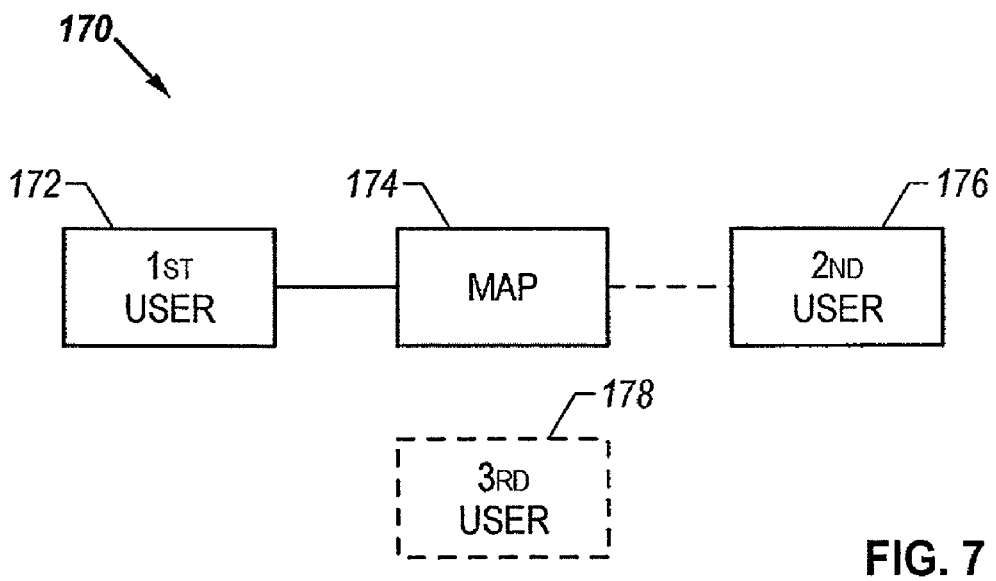
FIG. 7 is a schematic block diagram of an exemplary embodiment of a map as seen in FIG. 5.

Turning to methods of displaying and manipulating data, a map configuration may be established and stored on the server. The map configuration may be accessible by various user. In one exemplary embodiment, FIG. 7 is a schematic block diagram of a user association for the map configuration. A first user 172 may create a mapping of icons. The icons may be associated with network appliances. These network appliances may be active or passive devices. Further, the icons may be arranged and/or superimposed on a background image. The first user may establish a permission data. The permission data may for example give a second user 176 access to the map data 174. The second user may be given permission to view or edit the map configuration data, or both. Alternately, the first user may give viewing permission or exclude another user 178.

Additionally, the map view may be "locked" or "unlocked". When "locked", the icons and objects on the view are not movable, preventing accidental or intentional manipulation of the layout. The privilege of "unlocking" of the map view can be restricted, allowing a map to be created and maintained by one user account, and safely shared with other, less privileged, users.

The icons may take various forms. These visual forms may be indicative of type, alarm status, parameter value, capabilities, and version, among others. For example, an icon may have a shape representative of it capabilities, a color representative of a sensor value, a right hand flag with a label, a top flag with a numerical value. In addition, the flags may change color in response to alarm conditions. However, various changes and uses of visual characteristics can be envisaged to represent various data associated with network appliances. Each icon may have some, all, or none of these features.

The icons may also link to other images, displays, and data. For example, the user, through an action such as, for example, clicking on the icon may display another mapping, a data table, and an icon configuration, among others. Furthermore, the user may manipulate the icon configuration and store the configuration on the server.

Figure 8A:
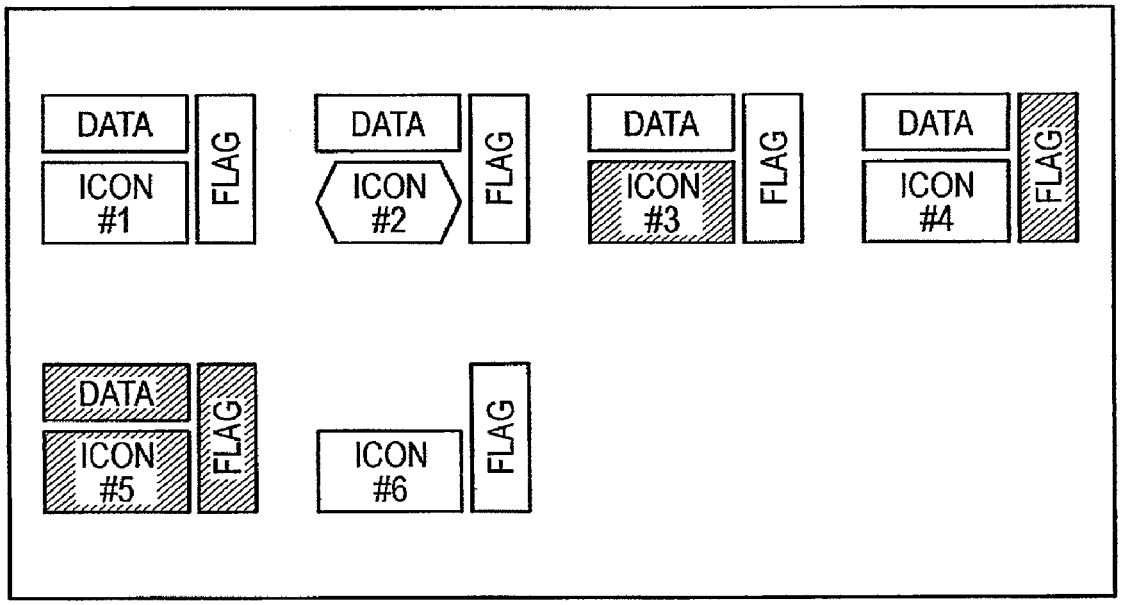
FIG. 8A is schematic block diagram of an exemplary embodiment of the map as seen in FIG. 7.
Figure 8B:
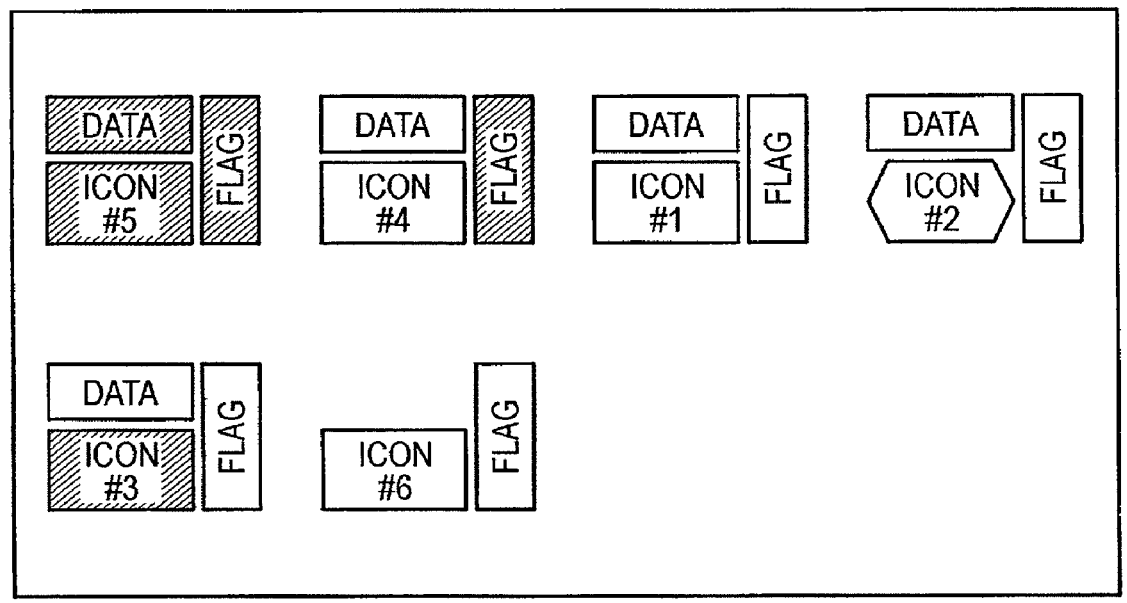
FIG. 8B is a schematic block diagram of another exemplary embodiment of the map as seen in FIG. 7.
Figure 8C:
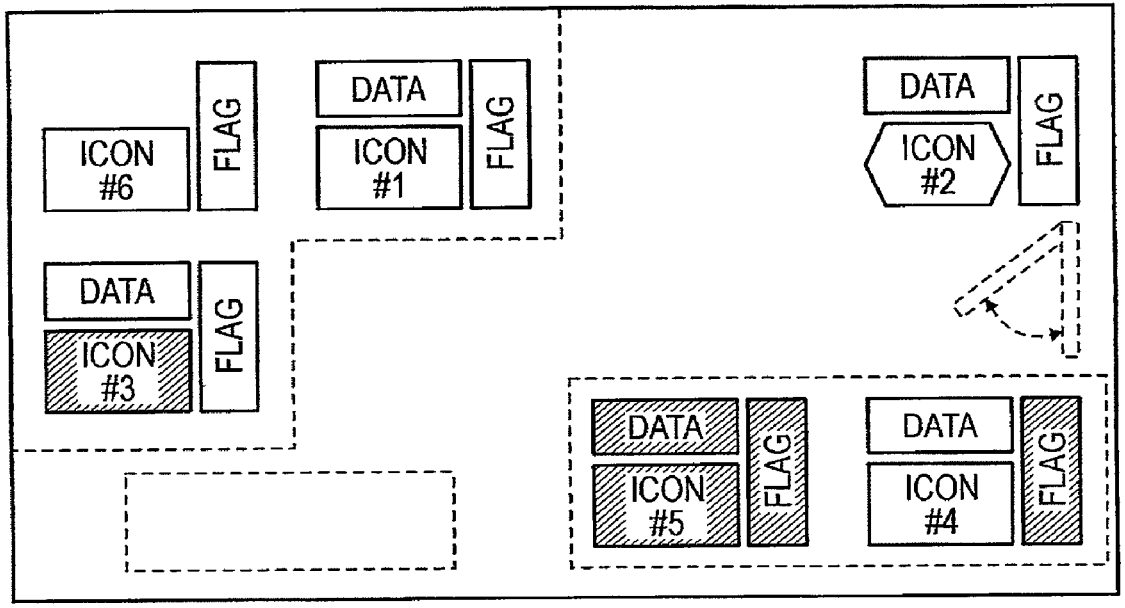
FIG. 8C is a schematic block diagram of a further exemplary embodiment of the map as seen in FIG. 7.
Figure 8D:
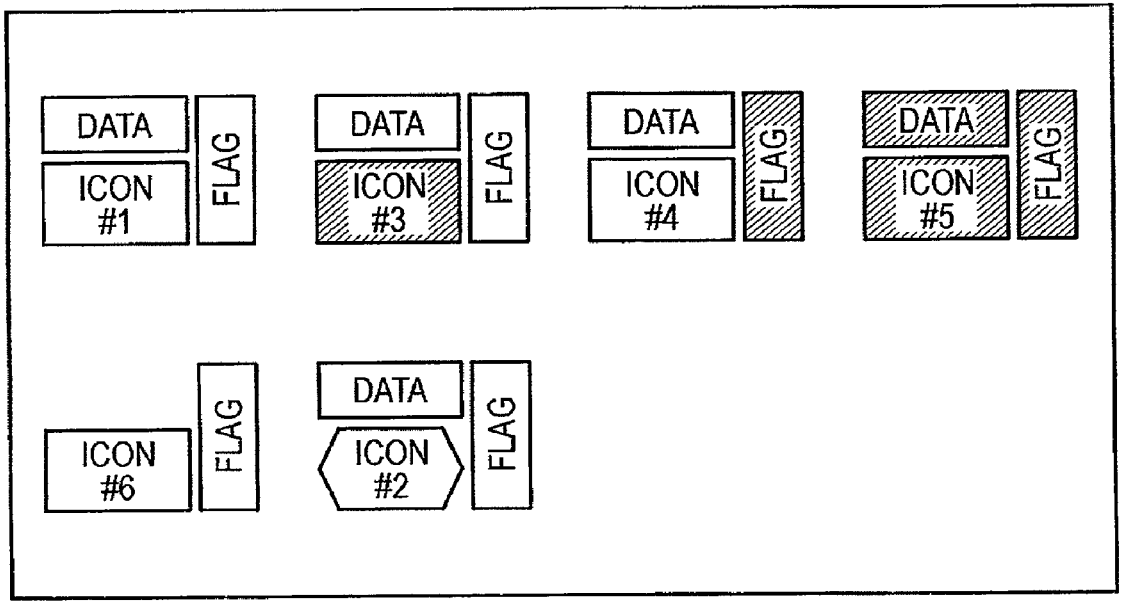
FIG. 8D is a schematic block diagram of another exemplary embodiment of the map as seen in FIG. 7.

Further, the icons may be arranged in a display in accordance with some characteristic. For example they may be arrange according to a sensor value, an alarm state, a physical location, or randomly, among others. FIG. 8A is schematic block diagram of an exemplary embodiment of a map. The icons may be arranged in a display area. For example, icons associated with a user may be viewed. FIG. 8B is a schematic block diagram of an exemplary embodiment of a map. As shown, the icons may be arranged according to an alarm state as indicated by a shaded flag. Alternately, the icons may be arranged according to physical location as shown in FIG. 8C. For example, the location may be a location within a room, geography, or server rack. Further, the icons may be superimposed on a map or image indicative of the location. The map or image may change in response to events associated with the network appliances. For example an image representing a room may be replaced with a similar image indicating an open door. However, the image may be a picture, video image, plot, graph, blueprint, or map, among others. In another example, the icons may be arranged according to network appliance type, as depicted in FIG. 8D. The shape of the icon may for example represent the type or version. However, various pairings between visual characteristics and data may be envisaged. These map configurations and associated accessibility information may be stored on the server and accessed by the client.

The icons and object displayed on the map view may include both active network devices and passive devices. The ability to add and manipulate the passive devices along with the active network devices may allow the user to accurately represent the physical environment of his equipment rooms, for example. Other exemplary implementations may allow the end-user to import graphical images in a variety of formats (GIF, BMP, JPG, etc) to use as icons customized for their specific equipment (both active and passive).

In one embodiment, a mapping may be associated with a grouping of network appliances. This grouping may, for example, be related to physical location or topology. In one example, environmental sensor readings may be displayed on the map views as part of the icon. The map view may display a single sensor attribute at a time on each of the active devices supporting the given sensor. For example, when temperature is selected, each device that supports a temperature sensor has the most current reading of that sensor presented. In conjunction with the physical representation afforded by the map view, this may enable a presentation of the two-dimensional "field" associated with the given sensor. The map view may also allow very rapid selection of different sensors readings via a context menu, allowing a user to quickly cycle between the values of different sensors without needing to open additional windows. For sensor types that have potentially different units of measurement (degrees C. versus degrees F., ft/min versus meters/min), the view appropriately converts all sensor values to the unit of measurement most appropriate to the locale and preferences of the user, even when the data actually supplied by the different devices is natively in different units (degrees C. from one device, degrees F. from another).

The map may also use map colorization. Map colorization refers to the ability to use color to represent sensor readings for an environment. This can be as simple as putting the sensor reading of the device on the icon or changing the color of the icon to represent a sensor threshold range. Also, the background of the map surrounding the icons may look like a contour plot to display sensor readings from around the room.

Another implementation of present invention may include support for a variety of enclosures, such as equipment racks and cabinets, that will allow presentation of multiple devices stacked vertically at the same location. Map Colorization of these enclosures will allow sensor reading to be presented with respect to vertical positioning, as well as horizontal. In addition, the vertical positions will enable the presentation on the standard Map View of sensors values for a given "slice" of the room (i.e. all temperature sensors at the top of the racks, the middle of the racks, or under the raised floor).

Additional use of the feature could allow the presentation of various attributes generated from multiple related sensors in the same enclosure. For example, each rack could be displayed with the temperature delta between the temperature reading of the cool air flowing into the rack versus the exhaust temperature.

The map view may also auto-sort by alarm severity. For example, environmental sensor alarms may be sorted to be displayed at the top of the map, followed by network connectivity alarms, and lastly by devices that are not in alarm state.

The display string for each icon may be user configurable to vertically display a customizable user-friendly "name" for each device. The devices that are red may have environmental sensor alarms, the devices that are yellow may have network connectivity alarms, and the gray devices may be in a normal state. The colors may be user customizable. In the colorized mode, the display string may show the alarm status.

This ordering and representation allows the user to quickly determine which devices need attention, even in a group containing hundreds or thousands of devices, since the user can quickly look at the first devices listed and know which devices need attention. Also, the user can quickly conclude by the fact that the first device listed has no errors that none of the other devices currently do.

Network appliance configuration data may also be stored on the server. This configuration data may include parameters, contact data, alarm settings, email lists, alert lists, algorithms, password and access data, and threshold data, among others. The client may retrieve and manipulate the data. For example, the client machine may display configuration data for multiple network appliances. This configuration data may, for example, be displayed as a table. The client machine may change some, all, or none of the data. Further, the client machine may change the value of a similar parameter associated with several network appliances to the same value.

FIGS. 9A and 9B are block diagrams depicting exemplary embodiments of tables for use in manipulating configuration data. Configuration data may take various forms. These forms may include parameters, settings, notification lists, address, responsibility lists, algorithms, software, and communications protocols, among others. The configurations may be changed by selecting a single cell and making a change as seen in the data column for network appliance #5. Alternately, all cells may be selected at once and changed to the same value as seen for parameter #1. However, fewer cells may be selected and changed as seen for parameter #2.

The system may provide a mass configuration mechanism for managing the settings for our HTTP configurable appliances. The server may be modified via its software plug-in architecture to handle mass configuration of any HTTP configurable appliance.

The use of HTTP Posts for configuration management of the appliances may allow configuration to be done more quickly, efficiently, and with better transactional integrity than SNMP-based configuration. Each HTTP Post may be used to configure multiple parameters in parallel, preventing the possibility of the appliance's configuration being partially updated (resulting in an unusable configuration) as well as reducing the number of network transactions required to complete a configuration update. As with all HTTP communications, the use of TCP/IP (as opposed to the UPD/IP used by SNMP) tends to minimize problems with WANs and firewalls.

The system may provide a mechanism for viewing the current software and hardware levels of our appliances and for updating them. A status column may display any errors that occur during the version query process and displays textual progress messages during the upgrade process. At any time, a user may click on a cell in this column and view a popup that displays the entire status message since they are frequently longer than can be conveniently displayed in a single column of a spreadsheet.

Another exemplary implementation of the system may include support for managing the configuration of an appliance that is only capable of communicating with the Server, but which cannot be communicated with by the Server. The system may store and maintain a copy of the settings desired by the user for a given appliance. These settings may be determined in the same fashion as they are currently set with the Mass Configuration interfaces. Since the Server cannot initiate communications with the firewalled appliances, it will simply record the desired settings to be communicated later.

On the appliances, support may be added for configuring the appliance to issue periodic HTTP Posts to the present invention, querying for configuration updates. Whenever a configuration update request Post is issues to the server, the server may have the option of including (as the content of the reply to the Post) a single command block structured the same as the input for an HTTP GET or POST would be if issued directly to the Appliance. When the reply to the configuration update request includes this content, the Appliance may process it as if the given HTTP GET or POST had been issued to the Appliance as normal. When completed, the output of this request may be delivered to the server as the input to a second HTTP Post to the present invention. The server may then process the input of the Post (which is the reply to the request he issued with the previous Post), and may either reply with the input for the next HTTP GET or POST (repeating the process), or with no input (if no further requests are pending).

FIG. 10 is a block flow diagram of an exemplary method for manipulating configuration data, among other data. In the method 190, the client machine may retrieve the data from the server, as seen in a block 192. A user may manipulate the data as seen in a block 194. Next, the server may store the data. Then, the data may be transferred to the network appliance or an intermediary network appliance as seen in a block 198.

For example, a client machine may request using an HTTP command data and/or applications associated with manipulating configuration data. A user may manipulate the data in a Java enabled browser. The client machine may then, using an HTTP command send the manipulated data to the server for storage. A network appliance may ping the server. The server may respond to the ping with the manipulated data. However, various means and protocols may be envisaged for performing the method 190.

Figure 11:
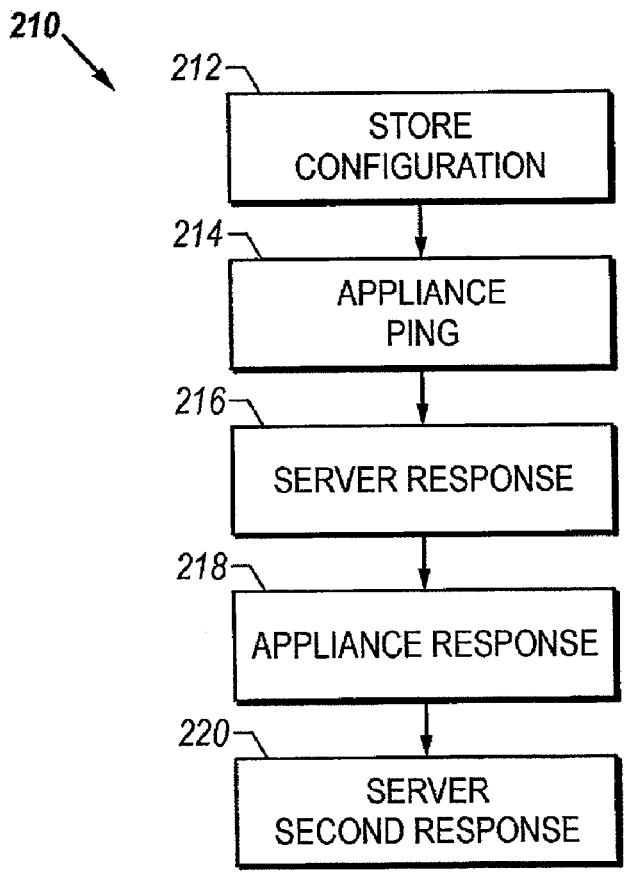
FIG. 11 is a block flow diagram of an exemplary method for use by the system as seen in FIG. 1.

FIG. 11 is a block flow diagram of an exemplary method for use by the system. As above, the server may store configuration data as seen in a block 212. The network appliance or an intermediary may ping the server. This ping may take various forms and use various protocols. For example, the ping may take the form of an HTTP POST, HTTP GET, or FTP command, among others. The sever may respond to the ping as seen in a block 216. The server may transfer data using a security protocol such as SSL. If configuration data or an upgrade is available, the server may include the data with the response. The network appliance may then respond to indicate the transfer was successful. Subsequently, the server may respond with more data or an indication that no more data is available.

An example of this interchange might go as follows:

An appliance issues its periodic HTTP Post for requesting configuration updates:

POST/centra/configquery HTTP/1.1
Host: 192.168.1.218:81
User-Agent: NetBotz/1.1.3
Accept: */*
Accept-Encoding: gzip
Accept-Language: en The server determines that there is a pending configuration update, and issues a POST to set the new setting (in this case, enabling the temperature threshold for a low of 60 degrees and a high of 80 degrees):

HTTP/1.1 200 OK
Date: Mon, 6 Aug. 2001 17:15:22 GMT
Server: Apache/1.3.17 (Unix) PHP/4.0.4p11
Last-Modified: Thu, 2 Aug. 2001 15:27:24 GMT
Content-Length: 260
Content-Type: binary/x-user-request
POST/setTemp HTTP/1.1
Authorization: Basic bmV0Ym90ejpwYXNzd29yZA=
Host: bc10
User-Agent: USER AGENT/1.2
Accept: *.*
Accept-Encoding: gzip
Accept-Language: en
VARIABLE=VALUE The Appliance may process the output of its Post as if the command had been sent to it through its web server, modifying the settings and generating a reply. The Appliance then issues another configuration request to the present invention, delivering the output:

POST/centra/configquery HTTP/1.1
Host: 192.168.1.218:81
User-Agent: AGENT/1.1.3
Accept: */*
Accept-Encoding: gzip
Accept-Language: en
HTTP/1.1 200 OK
Date: Mon, 6 Aug. 2001 17:15:25 GMT
Server: SERVER/1.1.3
Last-Modified: Mon, 6 Aug. 2001 17:15:25 GMT
Content-Length: 200
Content-Type: text/plain
VARIABLE 1: VALUE 1
VARIABLE 2: VALUE 2

The server may process the output, and determines if another request needs to be issued. If so, it replies to the Post with the next request (repeating steps 2-4 until all requests are done). If not, it simply replies with no output:

HTTP/1.1 200 OK
Date: Mon, 6 Aug. 2001 17:15:27 GMT
Server: Apache/1.3.17 (Unix) PHP/4.0.4p11
Last-Modified: Thu, 2 Aug. 2001 15:27:26 GMT The Appliance sees that there are no further requests, and waiting until the next configured configuration update polling time before issuing another configuration request HTTP Post.

This mechanism may allow the full span of features accessible through the Appliance's web server (including those provided via add-ons) to be accessed without requiring custom coding or modification, since any HTTP GET or POST request can be wrapped as shown above.

In addition, this approach may allow appliances that have lost their configuration to be configured simply by pointing them at the system. This Feature may use a set of HTTP GETs through this mechanism in order to validate an Appliance's configuration before applying any needed changes.

Network appliance data may be organized and associated by various means. The data may be organized by location, responsible party, organization, network appliance type, version, alarm state, and status among others. For example, the network appliances may be organized into groups. Groups may be dynamic or static lists of appliances that represent a set of appliances. Each logical group may be implemented through SQL query (used to produce a list of appliances) or a specific list of appliances, and a list of users that have access to the group for security, among others. When an SQL query is defined for a group, appliances are automatically assigned to the group (as well as removed from the group) based on their attributes matching the conditions dictated by the SQL query. For example, a group may be defined by an SQL query which logically selected "all appliances where the application version=1.2". Appliances upgraded from application version 1.1 to 1.2 would automatically be added to the group, while appliances upgraded from version 1.2 to 1.3 would automatically be removed.

Groups may be used to display the hierarchy of a business organization, the responsible IT person for said group, or to represent a physical location in a building. Other exemplary implementations may allow matching on a wide variety of attributes, including current sensor readings, alert states, and custom, user-defined appliance attributes.

Figure 12:
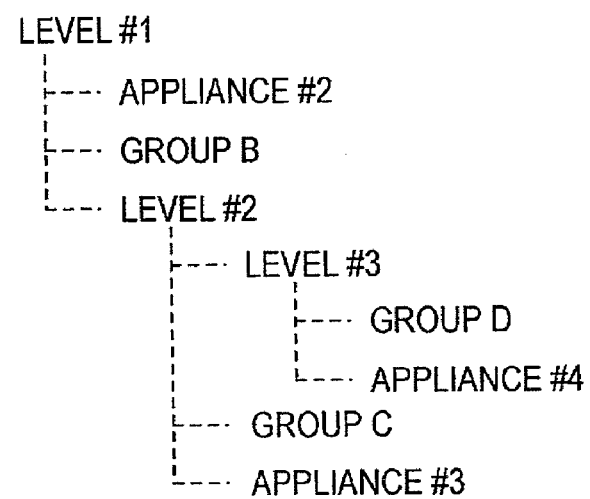
FIG. 12 is a schematic diagram of a exemplary embodiment of a grouping according to FIG. 5.

Further the associations may be manipulated and changed. For example, the client machine may retrieve data associate with network appliance and display them in a tree. FIG. 12 is a schematic of an exemplary tree. The tree may associate appliances in various groups and give access to individual appliances on various levels of the tree structure. Moreover, a user may manipulate groups, appliances associated with the groups, user access and permissions associated with the network appliance and groups, and the tree visual characteristics, among others.

The groups may also be represented in a table. The table may display various data associated with the network appliances. Further the table may be updated as data changes on the server. This update may for example, occur following a ping and/or query to the server. Alternately, the update may be provided by the server.

FIGS. 13A, 13B and 13C are block diagrams depicting an exemplary table associated with an exemplary group. In this exemplary embodiment and appliance may have an on/off status. This status may change as seen with network appliance #1. Further the other visual indications may be used to indicate status, such as, for example, shading. In addition, visual and/or acoustic indicators may be used to indicate alarms or valuations relative to thresholds. For example network appliance 2 may have an alarm associated with value #1 and shade that cell. The cells may be colorized to indicate alarm state. A user may also manipulate the values, parameters, and other characteristics displayed in a table. For example, a user may display the model or version. Further, the order of the network appliances may be varied in association with an alarm, a data value, or grouping.

A table may also be used to display historical data of events, alerts and alarms, among others. The data may include a data, time, available images, and other data.

Figure 14:
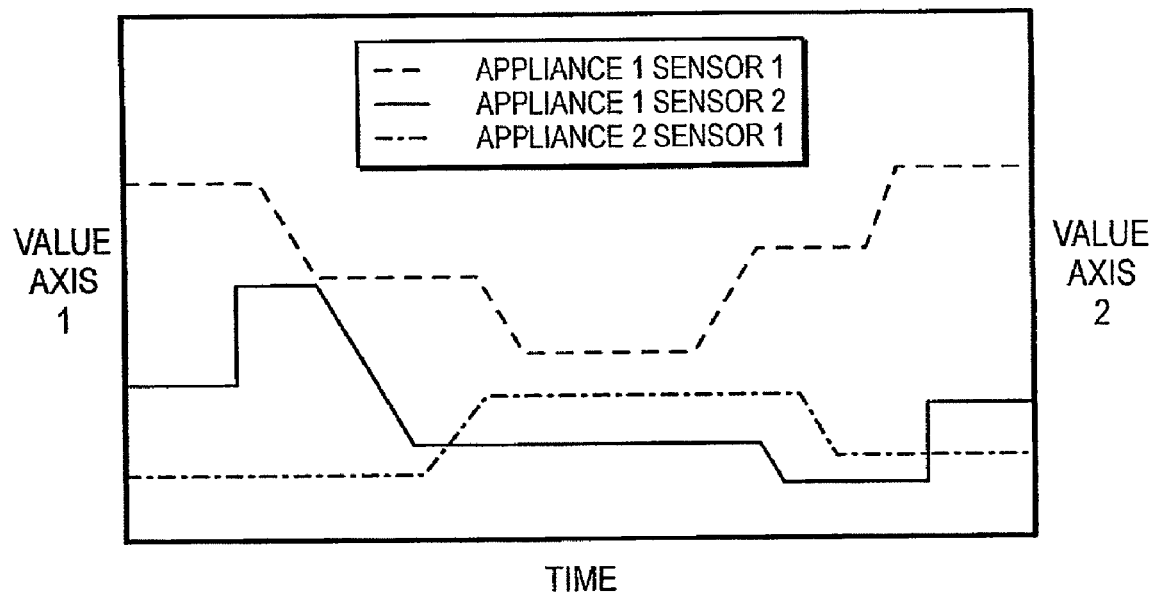
FIG. 14 is a chart of an exemplary embodiment as displayed by the system of FIG. 4.

Data associated with network appliances may also be displayed as a graph as seen in FIG. 14. The graph may display the same type of data for several network appliances, various data from various sensors for the same appliance, or various combinations, among others. The graph may be composed of historical data or may be updated as new data is available. Further, the graph may replay data, changing the graph to represent a next value in a series of values according to an accelerated schedule.

To compact the amount of data the server stores overall, a schema may be implemented to only store the changes in the environment. For example, if the system collected data from an Appliance every 10 minutes, and the temperature of the room was constant for over an hour creating a data point for each collection interval may increase the size of the stored data. Instead, only the changes may be recorded so the environment can be played-back to the user in as efficient a manner as possible. Since most environmental sensors tend to change value slowly and infrequently, this enables a significant reduction in the amount of data stored in the database of the present invention without any loss of resolution and accuracy: storing 100 rows, 1 per minute, indicating the same temperature reported by the same sensor is no more accurate or detailed (but consumes significantly more data) than one row reporting that the sensor was a given temperature for the 100 minutes between two points in time. This compaction of the recorded sensor data enables significantly more data to be recorded for more appliances for a longer time (estimates are 20-100 times as much as a conventional 1 sample per row schema). Each row may include both a starting timestamp and an ending timestamp, allowing easy creation of SQL queries requesting sensor readings at any given time (i.e. SELECT * WHERE ((START_TIME<=T) AND (END_TMIE>=T));).

The graphs may be depicted based on a time range and a set of particular sensor readings. Allowing more than one appliance to be graphed at a time allows users to physically view the patters of environmental changes as well as compare one area of a location against another. The graphs themselves may be organized by day, week, month, or for the entire time range provided. These graphs may then be saved as in a graphic format, such as, a JPEG, GIF, or BMP file, among others, for email and/or reports, or can be exported as comma-delimited text to another utility of the users choosing.

The graphs may also include markers indicating any alerts associated with the displayed sensor on the selected appliances. These markers may appear on the line graph at the point in time where the alarm was reported or on an axis, among others. Different markers may be used for alarms reporting errors versus alarms reporting the return-to-normal of a previously out-of-bounds sensor reading For example, a solid bullet may be used for errors, and an open bullet for return-to-normal alarms. This feature allows a concise and comprehensive view of the history of a given sensor on a set of appliances, both including the recorded data and highlighting the important events associated with that history.

Since some environment changes can be radically different than others, the graph view may implement zooming in on a particular set of data points. This provides the user with a more detailed graph of a smaller time range. Just like the other graphs, a zoomed-in graph can then be saved to a graphic format for email or exported as a comma delimited file for use in another application.

When the graph zoom is activated, the time and sensor units scales may be appropriately recomputed based on the selected range. In addition, the legend associated with the graph may be reduced to just include those appliances that have sensor data contained within the zoom window, allowing the zoom view to be effectively used to pull detailed information out of a graph containing more lines of data than could typically viewed effectively.

Figure 15:
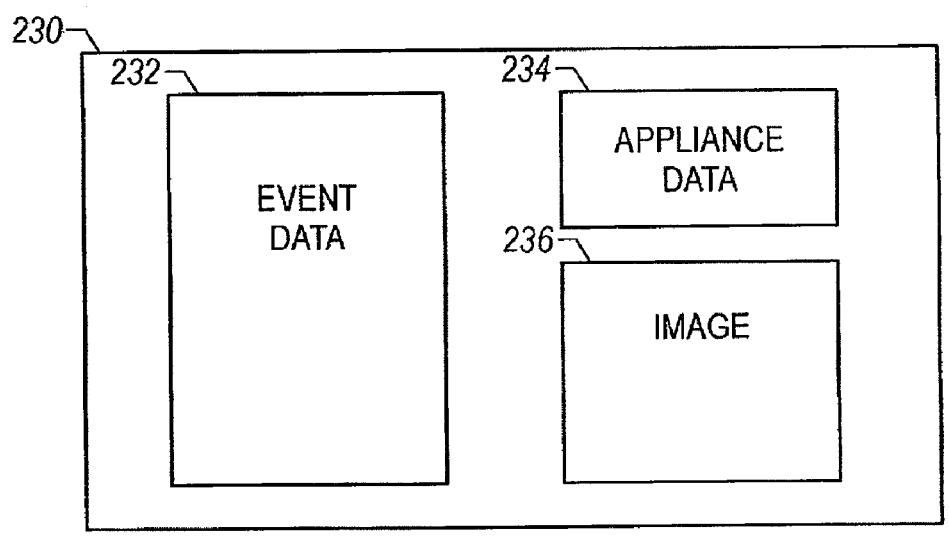
FIG. 15 is a schematic block diagram of an exemplary embodiment of a display for use by the system of FIG. 4.

In addition, data may be displayed and/or manipulated in other formats. For example, FIG. 15 shows a display for image data. The display area 230 may show an image. The image may be associated with an event such as, for example, a door sensor, an alarm, or a specified time, among others. The image 136 may be displayed with event data 232 and/or appliance data 234. However, more than one image may be displayed. A series of images may be displayed from a single appliance. Alternately an array of images from several network appliances.

The event may be a recent event or a stored historical event. Further, the images and data may be stored in a manner which associates the image with the event and/or the data.

As such, a remote monitoring system is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims that follow.

What is claimed is:

1. A method for mass configuration of a plurality of network appliances, the method comprising:
   displaying, to a user, configuration data associated with each of the plurality of network appliances, the configuration data including at least one parameter applicable to every network appliance of the plurality of network appliances;
   receiving an update for the configuration data from the user, the update specifying a new value for the at least one parameter;
   receiving a plurality of hypertext transfer protocol (HTTP) communications from the plurality of network appliances, each of the plurality of HTTP communications respectively corresponding to a network appliance of the plurality of network appliances; and
   transmitting, respectively in response to receiving each of the plurality of HTTP communications, update information specifying the new value of the at least one parameter to a corresponding network appliance of the plurality of network appliances using at least one of a ping, HTTP GET and HTTP POST.

2. The method according to claim 1, wherein displaying, to the user, the configuration data includes grouping the configuration data according to attributes of each of the plurality of network appliances with which the configuration data is associated.

3. The method according to claim 1, wherein displaying, to the user, the configuration data includes displaying the configuration data in a browser executing on a client machine.

4. The method according to claim 1, wherein displaying, to the user, the configuration data includes displaying the configuration data in a tree view.

5. The method according to claim 1, wherein displaying, to the user, the configuration data includes displaying the configuration data in a plurality of cells in a table.

6. The method according to claim 5, wherein receiving the update of the configuration data includes receiving data entered by a user into the plurality of cells.

7. The method according to claim 1, wherein displaying, to the user, the configuration data includes displaying a current value for the configuration data.

8. The method according to claim 7, wherein displaying, to the user, the configuration data includes indicating a comparison of the current value to a second value.

9. The method according to claim 8, wherein indicating the comparison includes comparing the current value to a threshold value.

10. The method according to claim 8, wherein indicating the comparison includes colorizing the current value.

11. The method according to claim 1, wherein receiving the update for the configuration data includes receiving the update at a client machine.

12. The method according to claim 1, wherein receiving the update for the configuration data include receiving the update at a server.

13. The method according to claim 1, wherein transmitting the update information includes transmitting update information at a time determined by a function of server activity.

14. The method according to claim 1, further comprising:
receiving the update information by at least one of the plurality of network appliances; and
manipulating settings stored on the at least one of the plurality of network appliances based at least in part on the update information.

15. The method according to claim 1, wherein transmitting the update information includes wrapping at least one of a HTTP GET and HTTP POST in the update information.

16. The method according to claim 1, wherein transmitting the update information includes transmitting update information through a firewall.

17. The method according to claim 1, further comprising transmitting the plurality of HTTP communications at a time determined by a function of network appliance activity.

18. A system for mass configuration of a plurality of network appliances, the system comprising:
an output;
an input;
a network interface; and
a controller coupled to the output, the input and the network interface and configured to:
display, to a user, configuration data associated with each of the plurality of network appliances via the output, the configuration data including at least one parameter applicable to every network appliance of the plurality of network appliances;
receive an update for the configuration data from the user via the input, the update specifying a new value for the at least one parameter;
receive a plurality of hypertext transfer protocol (HTTP) communications from the plurality of network appliances via the network interface, each of the plurality of HTTP communications respectively corresponding to a network appliance of the plurality of network appliances; and
transmit, respectively in response to receiving each of the plurality of HTTP communications, update information specifying the new value of the at least one parameter to a corresponding network appliance of the plurality of network appliances via the network interface using at least one of a ping, HTTP GET and HTTP POST.

19. The system according to claim 18, wherein the controller, in displaying the configuration data, is further configured to group the configuration data according to attributes of each of the plurality of network appliances with which the configuration data is associated.

20. A non-transitory computer readable medium having stored thereon sequences of instruction for performing mass configuration of a plurality of network appliances, including instructions that will cause at least one processor to:
display, to a user, configuration data associated with each of the plurality of network appliances, the configuration data including at least one parameter applicable to every network appliance of the plurality of network appliances;
receive an update for the configuration data from the user, the update specifying a new value for the at least one parameter;
receive a plurality of hypertext transfer protocol (HTTP) communications from the plurality of network appliances, each of the plurality of HTTP communications respectively corresponding to a network appliance of the plurality of network appliances; and
transmit, respectively in response to receiving each of the plurality of HTTP communications, update information specifying the new value of the at least one parameter to a corresponding network appliance of the plurality of network appliances using at least one of a ping, HTTP GET and HTTP POST.

\* \* \* \* \*